US008113418B2

(12) United States Patent
Howarth et al.

(10) Patent No.: US 8,113,418 B2
(45) Date of Patent: Feb. 14, 2012

(54) VIRTUAL READERS FOR SCALABLE RFID INFRASTRUCTURES

(75) Inventors: Arthur G. Howarth, Orleans (CA); Roland Saville, Oakland Park, FL (US); Prasad Miriyala, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 995 days.

(21) Appl. No.: 11/496,779

(22) Filed: Jul. 31, 2006

(65) Prior Publication Data

US 2006/0266832 A1    Nov. 30, 2006

Related U.S. Application Data

(63) Continuation-in-part of application No. 11/010,089, filed on Dec. 9, 2004, now Pat. No. 7,422,152.

(60) Provisional application No. 60/570,999, filed on May 13, 2004.

(51) Int. Cl.
*G06F 17/00* (2006.01)
(52) U.S. Cl. ........................................ 235/375; 235/491
(58) Field of Classification Search .................. 235/375, 235/491
See application file for complete search history.

(56) References Cited

U.S. PATENT DOCUMENTS

| | | | |
|---|---|---|---|
| 4,625,081 A | 11/1986 | Lotito et al. | |
| 4,688,026 A | 8/1987 | Schribner et al. | |
| 5,339,073 A | 8/1994 | Dodd et al. | |
| 5,588,009 A | 12/1996 | Will | |
| 5,646,616 A | 7/1997 | Komatsu | |
| 5,850,187 A | 12/1998 | Carrender et al. | |
| 5,887,176 A | 3/1999 | Griffith et al. | |
| 6,070,187 A | 5/2000 | Subramaniam et al. | |
| 6,111,517 A | 8/2000 | Atick et al. | |
| 6,115,079 A | 9/2000 | McRae | |
| 6,212,563 B1 | 4/2001 | Beser | |
| 6,300,903 B1 | 10/2001 | Richards et al. | |
| 6,324,575 B1 | 11/2001 | Jain et al. | |
| 6,330,597 B2 | 12/2001 | Collin et al. | |
| 6,393,458 B1 | 5/2002 | Gigliotti et al. | |

(Continued)

FOREIGN PATENT DOCUMENTS

EP    1355448    10/2003

(Continued)

OTHER PUBLICATIONS

US Office Action mailed Apr. 4, 2007 from (related) U.S. Appl. No. 10/866,285.

(Continued)

*Primary Examiner* — Daniel Hess
*Assistant Examiner* — Michael Andler
(74) *Attorney, Agent, or Firm* — Weaver Austin Villeneuve & Sampson LLP

(57) ABSTRACT

Some implementations of the invention involve forming "logical" or "virtual" devices by aggregating a plurality of physical devices. The physical devices may be, for example, controllers, RFID readers and/or storage devices. Some logical devices comprise components of physical devices, such as individual antennas from a plurality of RFID readers. The physical devices may be located near one another or may be distributed over a wide geographical area. Logical device definitions can also be concatenated to include devices having two or more levels of logical device definitions. A single logical device grouping may include physical devices at differing levels of a network hierarchy.

21 Claims, 21 Drawing Sheets

U.S. PATENT DOCUMENTS

| | | |
|---|---|---|
| 6,473,858 B1 | 10/2002 | Shimomura et al. |
| 6,539,281 B2 | 3/2003 | Wan et al. |
| 6,553,489 B1 | 4/2003 | Osler et al. |
| 6,677,852 B1 | 1/2004 | Landt et al. |
| 6,843,121 B1 | 1/2005 | DeBar et al. |
| 6,912,213 B2 | 6/2005 | Kim |
| 6,931,574 B1 | 8/2005 | Coupal et al. |
| 6,963,282 B1 | 11/2005 | Yeates et al. |
| 6,995,655 B2 | 2/2006 | Ertin et al. |
| 7,057,511 B2 | 6/2006 | Shanks et al. |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,103,040 B2 | 9/2006 | Aalbers et al. |
| 7,103,886 B2 | 9/2006 | Haller et al. |
| 7,117,364 B1 | 10/2006 | Hepper et al. |
| 7,129,837 B2 | 10/2006 | Shannon et al. |
| 7,150,017 B1 | 12/2006 | Vogl et al. |
| 7,165,722 B2 | 1/2007 | Shafer et al. |
| 7,177,915 B2 | 2/2007 | Kopchik |
| 7,205,897 B2 | 4/2007 | Lin |
| 7,221,660 B1 | 5/2007 | Simonson et al. |
| 7,260,115 B1 | 8/2007 | DeFord |
| 7,322,523 B2 | 1/2008 | Howarth et al. |
| 7,325,734 B2 | 2/2008 | Howarth et al. |
| 7,333,001 B2 | 2/2008 | Lane et al. |
| 7,333,479 B2 | 2/2008 | Jalkanen et al. |
| 7,336,175 B2 | 2/2008 | Howarth et al. |
| 7,345,585 B2 | 3/2008 | Singhal et al. |
| 7,394,381 B2 | 7/2008 | Hanson et al. |
| 7,422,152 B2 | 9/2008 | Howarth et al. |
| 7,568,015 B2 * | 7/2009 | Wang et al. ............ 709/220 |
| 7,593,427 B1 | 9/2009 | Wongsonegoro et al. |
| 7,648,070 B2 | 1/2010 | Droms et al. |
| 2001/0012292 A1 | 8/2001 | Merrill et al. |
| 2001/0028308 A1 | 10/2001 | De La Huerga |
| 2002/0001307 A1 | 1/2002 | Nguyen et al. |
| 2002/0016739 A1 | 2/2002 | Ogasawara |
| 2002/0046263 A1 | 4/2002 | Camerini et al. |
| 2002/0075805 A1 | 6/2002 | Gupta et al. |
| 2002/0161907 A1 | 10/2002 | Moon |
| 2003/0046339 A1 | 3/2003 | Ip |
| 2003/0065784 A1 * | 4/2003 | Herrod ............ 709/227 |
| 2003/0095032 A1 | 5/2003 | Hoshino et al. |
| 2003/0126248 A1 | 7/2003 | Chambers |
| 2003/0174714 A1 | 9/2003 | Manik et al. |
| 2003/0177374 A1 | 9/2003 | Yung et al. |
| 2003/0226887 A1 | 12/2003 | Komine et al. |
| 2004/0010594 A1 | 1/2004 | Boyd et al. |
| 2004/0021569 A1 | 2/2004 | Lepkofker et al. |
| 2004/0061646 A1 | 4/2004 | Andrews et al. |
| 2004/0064577 A1 | 4/2004 | Dahlin et al. |
| 2004/0069852 A1 | 4/2004 | Seppinen et al. |
| 2004/0073600 A1 | 4/2004 | Elo et al. |
| 2004/0100383 A1 | 5/2004 | Chen et al. |
| 2004/0108795 A1 | 6/2004 | Meek et al. |
| 2004/0128389 A1 | 7/2004 | Kopchik |
| 2004/0145474 A1 | 7/2004 | Schmidtberg et al. |
| 2004/0257202 A1 | 12/2004 | Coughlin et al. |
| 2004/0259557 A1 | 12/2004 | Bey |
| 2005/0021626 A1 | 1/2005 | Prajapat et al. |
| 2005/0027778 A1 | 2/2005 | Dimitrelis et al. |
| 2005/0080881 A1 | 4/2005 | Vorhees et al. |
| 2005/0093679 A1 | 5/2005 | Zai et al. |
| 2005/0099270 A1 | 5/2005 | Diorio et al. |
| 2005/0102406 A1 | 5/2005 | Moon |
| 2005/0199716 A1 | 9/2005 | Shafer et al. |
| 2005/0209947 A1 | 9/2005 | Shafer |
| 2005/0228887 A1 | 10/2005 | Wang et al. |
| 2005/0252957 A1 | 11/2005 | Howarth et al. |
| 2005/0252970 A1 | 11/2005 | Howarth et al. |
| 2005/0252971 A1 | 11/2005 | Howarth et al. |
| 2005/0253717 A1 | 11/2005 | Howarth et al. |
| 2005/0253718 A1 | 11/2005 | Droms et al. |
| 2005/0253722 A1 | 11/2005 | Droms et al. |
| 2005/0264420 A1 | 12/2005 | Vogel et al. |
| 2006/0005035 A1 | 1/2006 | Coughlin |
| 2006/0010086 A1 | 1/2006 | Klein |
| 2006/0022801 A1 * | 2/2006 | Husak et al. ............ 340/10.5 |
| 2006/0031374 A1 | 2/2006 | Lu et al. |
| 2006/0033606 A1 | 2/2006 | Howarth et al. |
| 2006/0044111 A1 | 3/2006 | Kollar et al. |
| 2006/0047464 A1 | 3/2006 | Kumar et al. |
| 2006/0053234 A1 | 3/2006 | Kumar et al. |
| 2006/0091999 A1 | 5/2006 | Howarth |
| 2006/0123467 A1 | 6/2006 | Kumar et al. |
| 2006/0132304 A1 | 6/2006 | Cabell |
| 2006/0143318 A1 | 6/2006 | Prajapat et al. |
| 2006/0146879 A1 | 7/2006 | Anthias et al. |
| 2006/0253590 A1 | 11/2006 | Nagy et al. |
| 2006/0280181 A1 | 12/2006 | Brailas et al. |
| 2007/0013518 A1 | 1/2007 | Howarth |
| 2007/0027966 A1 | 2/2007 | Singhal et al. |
| 2007/0080784 A1 | 4/2007 | Kim et al. |
| 2007/0109100 A1 | 5/2007 | Jett et al. |
| 2007/0112574 A1 | 5/2007 | Greene |
| 2007/0258048 A1 | 11/2007 | Pitchers |
| 2007/0283001 A1 | 12/2007 | Spiess et al. |
| 2008/0087730 A1 | 4/2008 | Howarth et al. |
| 2008/0104209 A1 | 5/2008 | Singhal et al. |
| 2008/0136599 A1 | 6/2008 | Sugano et al. |
| 2008/0197980 A1 | 8/2008 | Howarth et al. |
| 2009/0049191 A1 | 2/2009 | Tolliver |
| 2011/0004781 A1 | 1/2011 | Howarth |

FOREIGN PATENT DOCUMENTS

| | | |
|---|---|---|
| EP | 1376456 | 1/2004 |
| GB | 2365662 | 2/2002 |
| WO | WO98-26530 | 6/1998 |
| WO | WO03-021465 | 3/2003 |
| WO | WO2004-012424 | 2/2004 |
| WO | WO2005-114604 | 5/2005 |
| WO | WO2005-060208 | 6/2005 |
| WO | WO2005-114545 | 12/2005 |
| WO | WO2005-114602 | 12/2005 |
| WO | WO2005-114603 | 12/2005 |
| WO | WO2007-011591 | 1/2007 |
| WO | WO2008-016488 | 2/2008 |

OTHER PUBLICATIONS

US Office Action mailed Jun. 18, 2007 from (related) U.S. Appl. No. 11/010,089.

International Search Report, dated Oct. 13, 2005 from related International Application No. PCT/US05/16484, 6 pp. including Notification of Transmittal.

Written Opinion of the International Searching Authority, dated Oct. 13, 2005 from related International Application No. PCT/US05/16484, 5 pages.

"Simple Network Management Protocol", Internetworking Technologies Handbook, Chapter-56, printed Jul. 14, 2005, 12 pages.

D. Harrington et al, *An architecture for Describing Simple Network Management Protocol (SNMP) Management Frameworks*, RFC 3411, Dec. 2002, 64 pages.

R. Presuhn, Editor, *Version 2 of the Protocol Operations for the Simple Network Management Protocol (SNMP)*, RFC 3416, Dec. 2002, 31 pages.

International Search Report dated Feb. 17, 2006, from related International Application No. PCT/US05/15322, 5 pp. including Notification of Transmittal.

Written Opinion of the International Searching Authority dated Feb. 17, 2006, from related International Application No. PCT/US05/15322, 3 pp.

R. Droms, *Dynamic Host Configuration Protocol*, RFC 2131, Mar. 1997, 43 pages.

S. Alexander et al., *DHCP Options and BOOTP Vendor Extensions*, RFC 2132, Mar. 1997, 32 pages.

G. Stump et al., *The User Class Option for DHCP*, RFC 3004, Nov. 2000, 6 pages.

Y. T'Joens et al., *DHCP Reconfigure Extension*, RFC 3203, Dec. 2001, 6 pages.

M. Patrick, *DHCP Relay Agent Information Option*, RFC 3046, Jan. 2001, 14 pages.
EPCg1, *Frequently Asked Questions*, http://www.epcglobalinc.com/about/faqs.html, printed Mar. 24, 2005, 9 pages.
C. Lonvick, *The BSD Syslog Protocol*, RFC 3164, Aug. 2001, 28 pages.
U.S. Office Action mailed Jun. 26, 2007 from U.S. Appl. No. 11/195,160.
Notice of Allowance and Notice of Allowability, mailed Sep. 10, 2007 from U.S. Appl. No. 10/866,506.
Notice of Allowance and Notice of Allowability, mailed Sep. 28, 2007 from U.S. Appl. No. 10/866,507.
Notice of Allowance and Notice of Allowability, mailed Sep. 10, 2007 from U.S. Appl. No. 10/866,285.
Notice of Allowance and Notice of Allowability, mailed Oct. 11, 2007 from U.S. Appl. No. 11/010,089.
Notice of Allowance and Notice of Allowability, mailed Sep. 19, 2007 from U.S. Appl. No. 11/195,160.
US Notice of Allowance dated Jun. 1, 2009 issued in U.S. Appl. No. 11/954,721.
US Notice of Allowance dated Feb. 11, 2009 issued in U.S. Appl. No. 11/954,721.
US Office Action dated Aug. 13, 2008 issued in U.S. Appl. No. 11/954,721.
US Office Action dated Jul. 31, 2009 issued in U.S. Appl. No. 10/891,238.
US Office Action dated Mar. 31, 2009 issued in U.S. Appl. No. 11/304,944.
US Final Office Action dated Oct. 30, 2009 issued in U.S. Appl. No. 11/304,944.
US Notice of Allowance dated Jan. 11, 2008 issued in U.S. Appl. No. 11/010,089.
US Notice of Allowance dated Oct. 11, 2007 issued in U.S. Appl. No 11/010,089.
US Office Action dated May 12, 2008 issued in U.S. Appl. No. 11/104,140.
US Office Action Final dated Oct. 6, 2008 issued in U.S. Appl. No. 11/104,140.
US Examiner Interview Summary dated Jan. 14, 2009 issued in U.S. Appl. No. 11/104,140.
US Office Action dated Mar. 4, 2009 issued in U.S. Appl. No. 11/104,140.
US Office Action dated Aug. 6, 2008 issued in U.S. Appl. No. 11/119,169.
US Notice of Allowance and Examiner's Amendment dated Feb. 11, 2009 issued in U.S. Appl. No. 11/119,169.
US Notice of Allowance dated Jun. 4, 2009 issued in U.S. Appl. No. 11/119,169.
US Notice of Allowance dated Aug. 31, 2009 issued in U.S. Appl. No. 11/129,709.
US Notice of Allowance dated Apr. 13, 2009 issued in U.S. Appl. No. 11/129,709.
US Notice of Allowance dated Nov. 10, 2008 issued in U.S. Appl. No. 11/129,709.
US Notice of Allowance dated Aug. 8, 2008 issued in U.S. Appl. No. 11/129,709.
US Notice of Allowance dated Mar. 26, 2008 issued in U.S. Appl. No. 11/129,709.
US Office Action dated Nov. 26, 2008 issued in U.S. Appl. No. 11/182,312.
US Examiner's Amendment dated Nov. 7, 2007 issued in U.S. Appl. No. 11/195,160.
US Examiner's Amendment and Supplemental Notice of Allowance dated Oct. 22, 2007 issued in U.S. Appl. No. 11/195,160.
US Office Action dated Jun. 1, 2009 issued in U.S. Appl. No. 11/965,693.
Canadian Examination Report dated Nov. 17, 2008 issued in CA2565099.
Canadian Examination Report dated Feb. 4, 2008 issued in CA2565099.
Chinese Office Action (first) dated Feb. 29, 2008 issued in CN1954327.
Chinese Office Action (second) dated Aug. 15, 2008 issued in CN1954327.
Chinese Office Action (third) dated Feb. 20, 2009 issued in CN1954327.
Canadian Examination Report dated Feb. 1, 2008 issued in CA 2,565,456.
Chinese Office Action (first) dated Feb. 29, 2008 issued in CN1954329.
Chinese Office Action (second) dated Aug. 15, 2008 issued in CN1954329.
Chinese Office Action (first) dated Feb. 29, 2008 issued in CN200580015168.9.
Chinese Office Action (second) dated Aug. 15, 2008 issued in CN200580015168.9.
Australian Examination Report dated Apr. 17, 2009 issued in AU 2005246794.
PCT International Preliminary Examination Report dated Nov. 14, 2006 issued in WO2005114545.
PCT International Search Report dated Nov. 8, 2005 issued in WO2005-114545.
PCT Written Opinion dated Nov. 8, 2005 issued in WO2005114545.
PCT International Preliminary Examination Report dated Nov. 14, 2006 issued in WO2005-114602.
PCT International Search Report dated May 19, 2008 issued in WO2006107613.
PCT International Preliminary Examination Report dated Nov. 14, 2006 issued in WO2005-114603.
PCT International Search Report dated Jul. 13, 2006 issued in WO2005-114603.
PCT Written Opinion dated Jul. 13, 2006 issued in WO2005-114603.
PCT International Preliminary Examination Report dated Oct. 3, 2007 issued in WO2005114604.
PCT International Search Report dated Mar. 6, 2008 issued in WO2007011591.
PCT Written Opinion dated Mar. 6, 2008 issued in WO2007011591.
PCT International Preliminary Examination Report dated Mar. 17, 2009 issued in WO2007011591.
EPCTM Tag Data Standards Version 1.1 Rev.1.24, EPCglobal, Standard Specification, Apr. 1, 2004, 78 pages.
Johnston, M., "*DHCP Preboot Execution Environment (PXE) Options draft-ietf-dhc-pxe-options-01.txt*," Internet-Draft, Jan. 21, 2005, 7 pages.
Kanellos, "Newsmaker: Making sense of sensors," CNET News. com: news.com.com/Making+sense+of+sensors/ 2008-1082_3-5829415.html, Published: Aug. 12, 2005.
US Notice of Allowance dated Sep. 22, 2009 issued in U.S. Appl. No. 11/954,721.
US Office Action dated Apr. 14, 2010 issued in U.S. Appl. No. 11/304,944.
US Final Office Action dated Sep. 30, 2009 issued in U.S. Appl. No. 11/104,140.
US Notice of Allowance dated Apr. 19, 2010 issued in U.S. Appl. No. 11/119,169.
US Notice of Allowance dated Dec. 15, 2009 issued in U.S. Appl. No. 11/119,169.
US Office Action dated Jun. 10, 2009 issued in U.S. Appl. No. 11/182,312.
US Office Action dated Apr. 28, 2010 issued in U.S. Appl. No. 11/965,693.
US Office Final Action dated Nov. 2, 2009 issued in U.S. Appl. No. 11/965,693.
US Office Action dated Oct. 2, 2009 issued in U.S. Appl. No. 11/346,739.
US Office Action Final dated Apr. 14, 2010 issued in U.S. Appl. No. 11/346,739.
Canadian Office Action dated Oct. 7, 2009 issued is CA 2,565,451.
Chinese Office Action dated Oct. 23, 2009 issued in CN200580015166.X.
PCT International Preliminary Report on Patentability dated Nov. 23, 2006 issued in WO2005114545.
PCT International Preliminary Report on Patentability dated Nov. 23, 2006 issued in WO2005114602.

Johnston, M., DHCP Preboot Execution Environment (PXE) Options draft-ietf-dhc-pxe-options-01.txt, Internet-Draft, Jan. 21, 2005, 7 pages.

Johnson, R., TFTP Server Address DHCP Option draft-raj-dhc-tftp-addr-option-00.txt, Internet-Draft, Feb. 6, 2005, 7 pages.

Littlefield, J., Vendor-Identifying Vendor Options for Dynamic Host Configuration Protocol version 4 (DPHCPv4). RFC 3925, Oct. 2004, 9 pages.

Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

Polk, J., et al., Dynamic Host Configuration Protocol Option for Coordinate-based Location Configuration Information, RFC 3825, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pgs.

WhereNet, Products, http://wherenet.com/products_main.html, printed Apr. 16, 2005, 2 pgs.

EPCglobal Tag Data Standards Version 1.1 Rev.1.24, EPCglobal, Standard Specification, Apr. 1, 2004, 78 pages.

Global Location Number (GLN) Implementation Guide, Uniform Code Council, Inc., May 2002, 13 pages.

The Global Language of Business, retrieved from the internet: http://www.ean-int.org/locations.html, [retrieved Mar. 24, 2005], 5 pages.

"Cisco Application-Oriented Networking: A Network-Based Intelligent Message Routing System", http://www.cisco.com/en/US/products/ps6438/products_data_sheet0900aecd802c1f9c.html Data Sheet, Cisco Systems, Inc., Jul. 13, 2005, pp. 1-7.

"Cisco Catalyst 6500 Series Application-Oriented Networking Module", http://www.cisco.com/en/US/products/ps6438/products_data_sheet0900aecd802c1fe9.html Data Sheet, Cisco Systems, Inc. Jul. 13, 2005, pp. 1-3.

"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.

"Cisco Catalyst 6500 Series Application-Oriented Networking Module: Large Photo", Photo, Retrieved from the internet: http://www.oisco.com/en/US/products/ps644B/prod_view_selector.html [Retrieved Jul. 13, 2005], Cisco Systems, Inc. 1 page.

"The EPCglobal Architecture Framework" EPCglobal Final Version of Jul. 1, 2005, pp. 1-53.

Girardot, Marc and Sundaresan, Neel, "Millau: an encoding format for efficient representation and exchange of XML over the web" [Retrieved Jan. 31, 2005]. Retrieved from the internet: http:www9.org/w9cdrom/154/154.html 25 pages.

Fujitsu Limited, et al., "Web Services Reliability (WS-Reliability) Ver1.0", Jan. 8, 2003. pp. 1-45.

Biloruset, Ruslan et al., "Web Services Reliable Messaging Protocol (WS-ReliableMessaging)", Mar. 2004, pp. 1-40.

Mockapetris, P., "Domain Names—Concepts and Facilities", RFC 1034, Nov. 1987, 43 pages.

Mockapetris, P., "Domain Names—Implementation and Specification", RFC 1035, 55 pages.

International Search Report dated Jul. 13, 2006, from (related) International Application No. PCT/US05/16319, 5 pp. including Notification of Transmittal.

Written Opinion of the International Searching Authority dated Jul. 13, 2006, from (related) International Application No. PCT/US05/16319, 5 pp.

US Office Action mailed Aug. 9, 2006 from (related) U.S. Appl. No. 10/866,507.

US Office Action mailed Oct. 6, 2006 from (related) U.S. Appl. No. 10/866,506.

US Office Action mailed Oct. 6, 2006 from (related) U.S. Appl. No. 10/866,285.

US Office Action mailed Nov. 13, 2006 from (related)U.S. Appl. No. 11/073,245, 12 pp.

US Office Action mailed Jan. 18, 2007 from (related) U.S. Appl. No. 10/866,507, 4 pp.

US Office Action mailed Mar. 22, 2007 from (related) U.S. Appl. No. 10/866,506, 7 pp.

Abbott, et al., "Alternatives for Providing Routing and Location Information to Support Emergency Calling from IP Enterprises", NENA Technical Information Document; Oct. 3, 2003, XP002323684, 16 pgs.

EPCglobal EPCTM Generation 1 Tag Data Standards Version 1.1 Rev. 1.27; http://www.epcglobalinc.org/standards/tds/tds_1_|rev_1_27-standard-2005051.pdf; 87 pgs (submitted in 3 parts).

RFC-2236 Internet Group Management Protocol, v.1, Nov. 1997, retrieved from the Internet on Oct. 22, 2007 and Aug. 5, 2010 at http://www.faqs.org/rfcs/rfc2236.html, 19 pgs.

Canadian Examination Report dated Oct. 14, 2010, from CA Appl. No. 2565099.

EP Supplementary European Search Report dated Aug. 9, 2010, in Appl. No. EP05750091.0.

EP Office Action dated Oct. 8, 2010, in Appl. No. EP05750091.0.

EP Supplementary European Search Report dated Aug. 6, 2010, in Appl. No. EP05743006.8.

EP Office Action dated Oct. 18, 2010, in Appl. No. EP05743006.8.

EP Supplementary European Search Report dated Aug. 6, 2010, in Appl. No. EP05747434.8.

EP Office Action dated Oct. 26, 2010, in Appl. No. EP05747434.8.

EP Supplementary European Search Report dated Aug. 6, 2010, in Appl. No. EP05753531.2.

EP Office Action dated Oct. 8, 2010, in Appl. No. EP05753531.2.

US Non-Final Office Action dated Jul. 31, 2009, from U.S. Appl. No. 10/891,238.

US Final Office Action dated Feb. 4, 2010, from U.S. Appl. No. 10/891,238.

US Final Office Action dated Nov. 17, 2010, from U.S. Appl. No. 10/891,238.

US Office Action dated Oct. 28, 2010, from U.S. Appl. No. 11/304,944.

US Non-Final Office Action dated Oct. 26, 2010, from U.S. Appl. No. 12/082,635.

US Non-Final Office Action dated Aug. 23, 2010, from U.S. Appl. No. 11/104,140.

US Office Notice of Allowance dated May 11, 2010, from U.S. Appl. No. 11/182,312.

US Office Notice of Allowance dated Sep. 1, 2010, from U.S. Appl. No. 11/182,312.

US Office Action dated Nov. 16, 2010, from U.S. Appl. No. 11/965,693.

US Office Action dated Apr. 15, 2011, from U.S. Appl. No. 10/891,238.

US Office Action dated Feb. 7, 2011, from U.S. Appl. No. 11/304,944.

US Final Office Action dated Jul. 20, 2011, from U.S. Appl. No. 11/304,944.

US Office Action dated Jun. 18, 2007, from U.S. Appl. No. 11/010,089.

US Non-Final Office Action dated Apr. 4, 2011, from U.S. Appl. No. 12/082,635.

* cited by examiner

DNS Table

| | | |
|---|---|---|
| A.Door235.W14.RFID.cisco.com, | 1.1.1.1 | — 355 |
| B.Door235.W14.RFID.cisco.com, | 1.1.1.2 | — 360 |
| C.Door235.W14.RFID.cisco.com, | 1.1.1.3 | — 365 |
| mw-srv-1.W14.RFID.cisco.com, | 1.1.2.1 | — 370 |
| mw-srv-2.W14.RFID.cisco.com, | 1.1.2.2 | — 375 |

*Fig. 3C*

DNS Table

| | |
|---|---|
| A.Door235.W14.RFID.cisco.com, | 1.1.1.1 |
| B.Door235.W14.RFID.cisco.com, | 1.1.1.2 |
| C.Door235.W14.RFID.cisco.com, | 1.1.1.3 |
| mw-srv-1.W14.RFID.cisco.com, | 1.1.2.1 |
| mw-srv-2.W14.RFID.cisco.com, | 1.1.2.2 |
| W14.RFID.cisco.com | |

*Fig. 3D*

DNS Table — 355

A.Door235.W14.RFID.cisco.com, 1.1.1.1 — 385
TXT mw-srv-1.W14.RFID.cisco.com — 360
B.Door235.W14.RFID.cisco.com, 1.1.1.2
TXT mw-srv-2.W14.RFID.cisco.com — 390
C.Door235.W14.RFID.cisco.com, 1.1.1.3 — 365
TXT mw-srv-1.W14.RFID.cisco.com — 395
mw-srv-1.W14.RFID.cisco.com, 1.1.2.1
mw-srv-2.W14.RFID.cisco.com, 1.1.2.2
W14.RFID.cisco.com

DNS Table
A.Door100.W14.rfid.cisco.com, 1.1.1.1
B.Door100.W14.rfid.cisco.com, 1.1.1.2
C.Door100.W14.rfid.cisco.com, 1.1.1.3
mw-srv-1.W14.rfid.cisco.com, 1.1.2.1
mw-srv-2.W14.rfid.cisco.com, 1.1.2.2
controller1.rfid.cisco.com, 1.1.3.1
controller2.rfid.cisco.com, 1.1.3.2
vr1.rfid.cisco.com, 1.1.3.1

Fig. 14

VIRTUAL READERS FOR SCALABLE RFID INFRASTRUCTURES

CROSS-REFERENCES TO RELATED APPLICATIONS

This application is a continuation-in-part of U.S. patent application Ser. No. 11/010,089, entitled "Methods and Devices for Providing Scalable RFID Networks" and filed on Dec. 9, 2004 now U.S. Pat. No. 7,422,152, which claims priority to U.S. Provisional Patent Application No. 60/570, 999, entitled "Methods and Devices for Uniquely Provisioning RFID Devices" and filed on May 13, 2004, both of which are hereby incorporated by reference for all purposes.

BACKGROUND OF THE INVENTION

1. Field of the Invention

The present invention relates to radio frequency identification ("RFID") technology. More particularly, the present invention relates to networks that include RFID devices.

2. Description of the Related Art

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes a variable number of bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is normally a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags beyond approximately one centimeter.

In part because of the significant efforts that have been expended in solving the foregoing problems, prior art systems and methods for networking RFID devices are rather primitive. RFID devices have only recently been deployed with standard network interfaces such as Ethernet. Device provisioning for prior art RFID networks is not automatic, but instead requires a time-consuming process for configuring each individual device.

Conventional RFID devices also have a small amount of available memory. A typical RFID device has a relatively small amount of flash memory and overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

Prototype RFID network deployments to date require large human/support intervention to be implemented. RFID devices are being deployed with "static" knowledge of where the device was deployed at original time of deployment. RFID devices are statically configured to a single RFID middleware server (formerly known as a "Savant"). Current implementations require each RFID middleware server to contact RFID devices that have been manually associated with that server. Moreover, such networks do not provide for RFID middleware server redundancy.

For these and other reasons, prior art devices and methods are not suitable for the large-scale deployment of RFID devices, middleware servers and other devices in a network. Methods and devices are needed for migrating first generation RFID systems to scalable RFID networks.

SUMMARY OF THE INVENTION

According to some implementations of the present invention, devices in an RFID network (such as RFID readers, controllers and middleware servers) are automatically provisioned and provided with network addresses. Associations between RFID devices and controllers, and between controllers and middleware servers, are automatically maintained. In some such implementations, the location data are included in a domain name of each device and stored in a DNS table.

Some preferred implementations of the invention involve forming "logical" or "virtual" devices by aggregating a plurality of physical devices. The physical devices may be, for example, controllers, RFID readers and/or storage devices. Some logical devices comprise components of physical devices, such as individual antennas from a plurality of RFID readers. The physical devices may be located near one another or may be distributed over a wide geographical area.

Logical device definitions can also be concatenated to include devices having two or more levels of logical device definitions. For the sake of convenience, a "logical" reader may be referred to herein as a sub-group of a "virtual" reader. For example, some implementations of the invention include multiple controllers that appear to a middleware server as components of a first logical reader. A controller (or each of a plurality of controllers) may aggregate a group of RFID readers and/or components of RFID readers as a second logical reader.

A single logical device grouping may include physical devices at differing levels of a network hierarchy. For example, a virtual device may comprise an aggregation of multiple controllers and a "smart" RFID reader that can provide middleware functionality.

Some implementations of the invention provide a networking method that includes the following steps: receiving, from a requesting device, a first request for information regarding a virtual radio frequency identification ("RFID") reader; translating the first request into second requests for data from a first plurality of devices aggregated as a first logical RFID reader, the first plurality of devices comprising a second plurality of controllers; sending one of the second requests to each of the second plurality of controllers; receiving RFID data from the second plurality of controllers responsive to the second requests; and sending at least some of the RFID data to the requesting device in response to the first request. The first plurality of devices may be aggregated as a first logical RFID reader according to requirements of the ECSpec. The requesting device may be, for example, an EPC server.

Each of the second plurality of controllers may translate the second request into a third request for RFID data from a third plurality of devices aggregated as a second logical RFID reader. Each of the third plurality of devices may comprise at least one antenna of an RFID reader in communication with the controller. In some such implementations, the third plurality of devices includes at least one antenna of each of multiple RFID readers aggregated as the second logical RFID reader.

The RFID data from the second plurality of controllers may or may not comprise current RFID tag read data. For example, at least one device of the first plurality of devices may comprise a storage device. Accordingly, RFID tag read data may be stored in, and obtained from, the storage device.

The method may also include the step of filtering the RFID data according to parameters of the first request prior to sending at least some of the RFID data to the requesting device. For example, the first request may comprise a request for information regarding products of a first enterprise and the filtering step may comprise filtering out RFID data not involving products of the first enterprise.

The may include the step of associating RFID readers and controllers by automatically forming domain name server ("DNS") entries. Controllers and middleware servers may also be associated by automatically forming DNS entries.

The first logical RFID reader may comprise physical devices in more than one geographic location. The first logical RFID reader may include at least one physical RFID reader. The physical RFID reader may or may not be configured with middleware.

The present invention provides hardware that is configured to perform the methods of the invention, as well as software and firmware to control devices to perform these and other methods. For example, some implementations of the invention provide a network that includes the following elements: a plurality of RFID devices in various locations of a site; a plurality of controllers associated with the site; a plurality of middleware servers associated with the site; a DNS server configured to maintain network addresses and corresponding location and site information; an application server configured to create, automatically, an entry in the DNS server corresponding to all registered devices of a site; and an assigner configured to assign RFID devices to controllers and to assign controllers to middleware servers.

The RFID devices may be provisioned with an RFID device network address, an assigner network address and instructions to send a request to the assigner for a controller. The assigner may be configured to assign an RFID device to a controller in response to the request. The controllers may be provisioned with a controller network address, an assigner network address and instructions to send a request to the assigner for a middleware server. The assigner may be configured to assign a controller to a middleware server in response to the request.

The assigner may comprise a load balancer. The application server may be configured to send requests to a middleware server. If so, the middleware server may retrieve controller location information and provide the controller location information to the application server in response to the application server's request. The application server may be configured to send requests to a controller. If this is the case, the controller may retrieve RFID reader location information and provides the RFID reader location information to the application server in response to the application server's request.

In some implementations of the network, the middleware servers are configured to do the following: receive a request from a requesting device for RFID data regarding a single enterprise; filter RFID tag reads according to the request; and return RFID data regarding the single enterprise to the requesting device.

These and other features of the present invention will be presented in more detail in the following detailed description of the invention and the associated figures.

BRIEF DESCRIPTION OF THE DRAWINGS

FIGS. 3B-3E illustrate a DNS table at various stages of the method illustrated in FIG. 3A.

FIG. 14 illustrates a DNS table that includes an entry for a virtual reader.

DETAILED DESCRIPTION OF THE INVENTION

Figure 1:
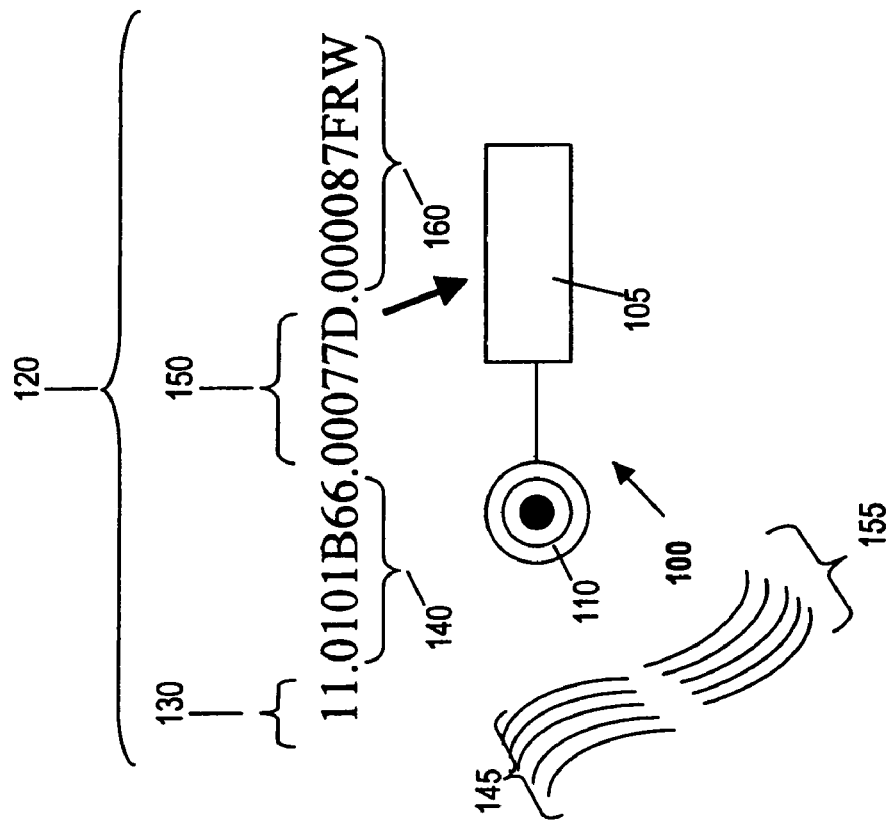
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The following patent applications are hereby incorporated by reference for all purposes: U.S. patent application Ser. No. 10/866,506, entitled "Methods and Devices for Uniquely Provisioning RFID Devices" and filed on Jun. 9, 2004, U.S. patent application Ser. No. 10/866,507, entitled "Methods and Devices for Locating and Uniquely Provisioning RFID Devices" and filed on Jun. 9, 2004, U.S. patent application Ser. No. 10/866,285, entitled "Methods and Devices for Assigning RFID Device Personality" and filed on Jun. 9, 2004, U.S. patent application Ser. No. 10/891,238, entitled "Methods and Devices for Determining the Status of a Device" and filed on Jul. 13, 2004, U.S. patent application Ser. No. 10/876,410, entitled "System and Method for Automatically Configuring Switch Ports with Appropriate Features" and filed Jul. 21, 2004, U.S. patent application Ser. No. 11/010,089, entitled "Methods and Devices for Providing Scalable RFID Networks" and filed on Dec. 9, 2004, U.S. patent application Ser. No. 11/104,140, filed on Apr. 11, 2005, entitled "Automated Configuration of Network Device Ports," U.S. patent application Ser. No. 11/119,169, filed on Apr. 29, 2005, entitled "Locating and Provisioning Devices in a Network," U.S. patent application Ser. No. 11/129,709, filed on May 12, 2005, entitled "Locating, Provisioning and Identifying Devices in a Network" and U.S. patent application Ser. No. 11/182,312, filed on Jul. 14, 2005, entitled "Provisioning and Redundancy for RFID Middleware Servers" (collectively, the "Cross-Referenced Applications").

The Cross-Referenced Applications describe methods and devices that allow for the dynamic location and provisioning of individual RFID devices in a network. RFID devices perform different functions and may interface to the upstream systems differently depending on where they are located. The functions they perform, as well as the unique settings to perform those functions, will be referred to herein as the device "personality." As used herein, "provisioning" a device can include, but is not limited to, providing network configuration, providing personality configuration, incorporating the device into a network database and enabling the device with software (e.g., business process software). The "location" of a device may be stationary or mobile: for example, the location may be a station of an assembly line in a factory or a door of a delivery truck.

A plurality of physical devices in an RFID network may be "virtualized" or logically aggregated. In some implementations of the invention, physical devices at or near a given location may be logically aggregated in a dynamic fashion. For example, the location may be a door, a loading dock, an area of an assembly line, etc. Such a virtualization may be implemented, for example, by including location data in, or associating location data with, a network address of each RFID device and assigning the same location data to each of the virtualized devices. For example, each RFID device that is deployed near a door (one example of a "location") of a warehouse (one example of a "site") may be virtualized by having a network address that includes location data corresponding with the door and site data corresponding with the warehouse. In some such implementations, the location and site data are included in a domain name of each RFID device and stored in a DNS table as part of a provisioning process.

According to some implementations of the present invention, RFID devices are also provisioned with instructions for sending a request for a middleware server to a middleware server assigner. The assigner determines to what middleware server a requesting RFID device will be assigned. In some implementations, the middleware server assigner is a type of load balancer.

In some implementations, an assigned middleware server is associated with an RFID device by dynamically associating the middleware server's network address(es) with the network address of the RFID device. The middleware server network address may include site data and/or a fully qualified domain name. The process of associating a middleware server with an RFID device may involve updating an entry of a DNS table corresponding to the RFID device to add, remove or modify a TXT field indicating the middleware server to which the RFID device is assigned. The TXT field may include a middleware server name and site data and/or a fully qualified domain name.

In some implementations, a DNS entry may be created for the site. For example, some such implementations provide a two-level lookup process for, e.g., determining all RFID devices deployed at a particular location. The DNS entry for the site allows application software to use DNS resolution to determine the device(s) from which to obtain the required data (e.g., a middleware server associated with the RFID devices). In this example, a DNS resolver for the application server would resolve the IP address of the middleware server. The middleware server returns the IP addresses of the relevant RFID devices.

Figure 2:
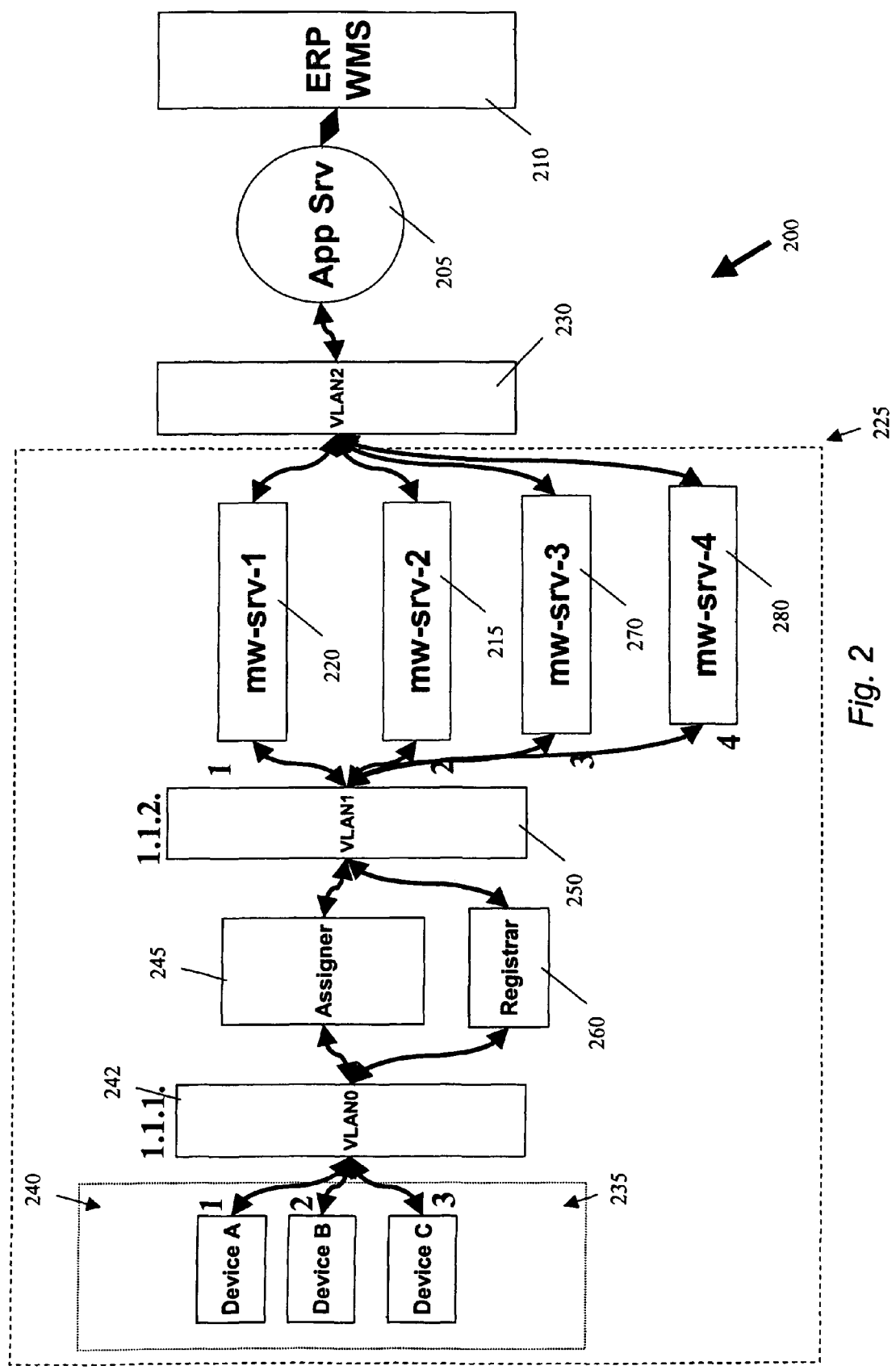
FIG. 2 is a block diagram illustrating a simplified portion of an RFID network of the present invention.

FIG. 2 illustrates a portion of a simplified RFID network 200 that will be used to describe some implementations of the invention. The details of network 200 are purely illustrative. Application server 205 operates according to instructions from application software 210 that resides in a memory device of, or accessible to, application server 205. Application server 205 is in communication with middleware servers 215 and 220 of site 225, via a virtual local area network ("VLAN") 230 in this example.

Site 225, which is "Warehouse 14" in this example, includes numerous locations at which RFID devices are deployed. One such location is door 235, where a plurality of RFID devices 240 are positioned. RFID devices 240 are in communication with middleware server assigner 245 via VLAN 242. Middleware servers 215 and 220 communicate with assigner 245 and registrar 260 via VLAN 250. As will be discussed in more detail below, in some preferred implementations assigner 245 is a type of load balancer.

Figure 3A:
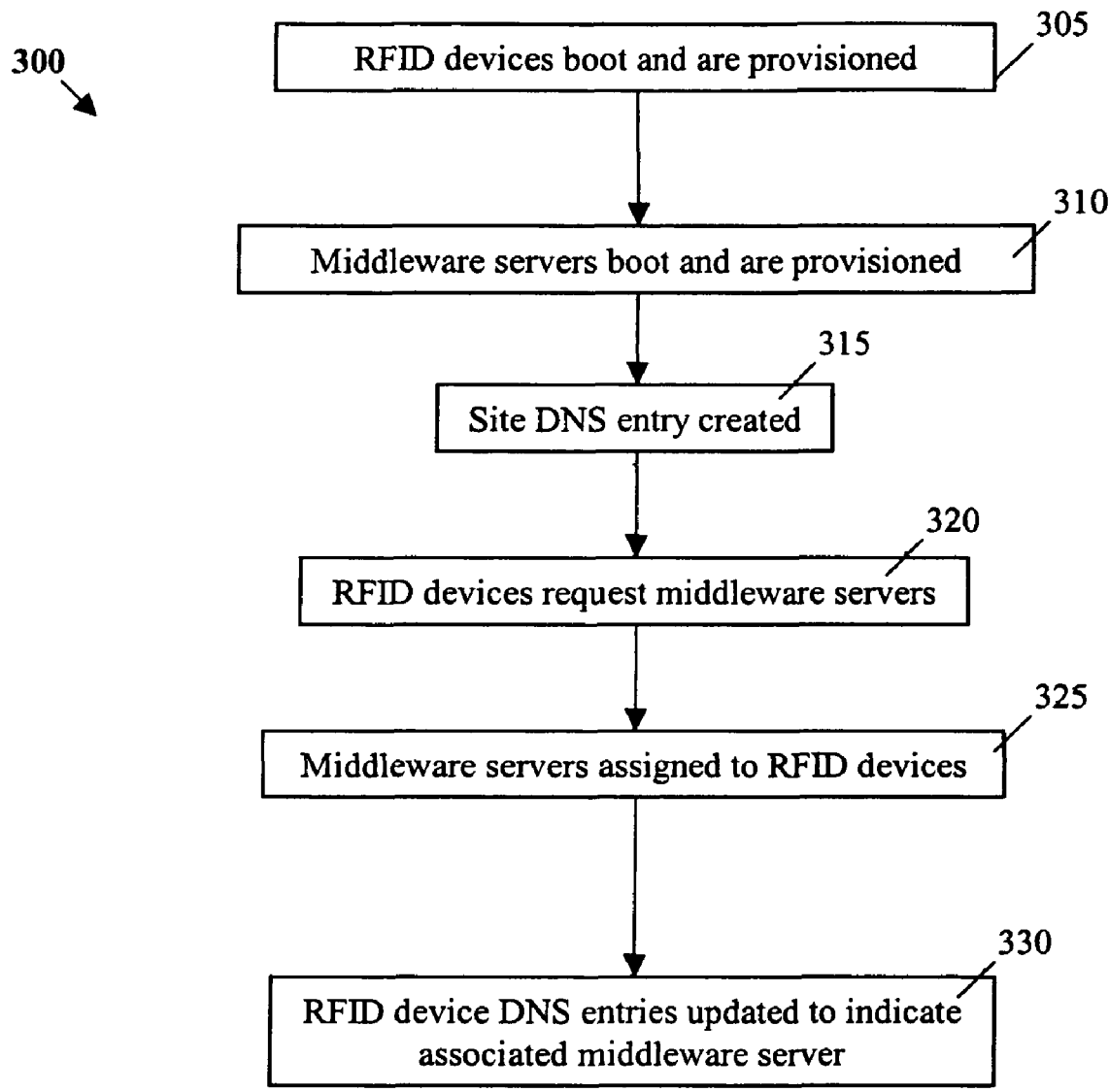
FIG. 3A is a flow chart that provides an overview of a method of the present invention.

FIG. 3A is a flow chart that provides an overview of method 300 according to the present invention. Those of skill in the art will appreciate that the steps of the methods discussed herein, including method 300, need not be performed (and in some implementations are not performed) in the order shown. Moreover, some implementations of the methods discussed herein may include more or fewer steps than those shown, e.g., in FIG. 3A.

In step 305, RFID devices in a network boot up and are provisioned. The RFID devices may be dynamically provisioned, for example, according to the methods described in the Cross-Referenced Applications. In addition to the types of provisioning described in the Cross-Referenced Applications, the RFID devices are also provided with the network address of a middleware server assigner and instructions for sending a request for a middleware server to the assigner.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes. In some preferred implementations, an EPC corresponding to an RFID device is put inside a DHCP request sent from the RFID device to a DHCP server. The EPC uniquely identifies the RFID device.

Some implementations employ Domain Name Service ("DNS") and dynamic DNS ("DDNS") to allow yet easier identification of RFID devices. RFC 1034 and RFC 1035 are hereby incorporated by reference and for all purposes.

Figure 3B:
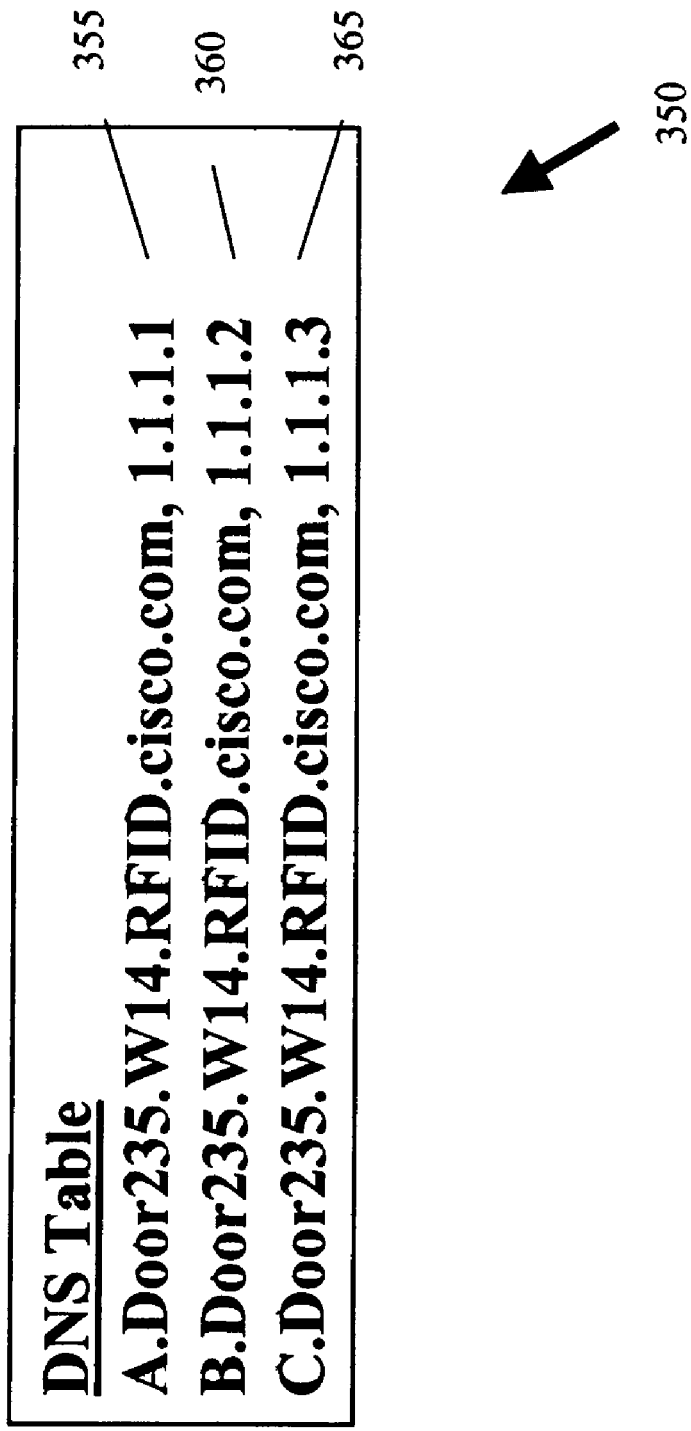

FIG. 3B illustrates one format for DNS entries in a DNS table 350 for RFID devices 240. In this example, DNS Table 350 is stored in 260, but DNS Table 350 could be stored elsewhere in network 200. In DNS table 350, the DNS entries have the following format:

<Device>.<Location>.<Site>.RFID.<Domain>

Accordingly, entry 355 for RFID device A of FIG. 2 includes domain name "A.Door235.W14.RFID.cisco.com" and the associated IP address. Corresponding entries 360 and 365 are formed for RFID devices B and C. One of skill in the art will readily understand that this format is merely one example and that many other suitable formats could be used for this purpose.

Referring again to FIG. 3A, in step 310 middleware servers in the network boot up and are provisioned. This process could be a manual process or an automated process, e.g., similar to that described in the Cross-Referenced Applications. As part of the provisioning process, middleware servers 215 and 220 are provided with network addresses, including domain names and IP addresses. Accordingly, entries 370 and 375 are added to DNS table 350, as shown in FIG. 3C.

In step 315, a site DNS is created for Warehouse 14. This entry could be created by application server 205, by another device or manually. Entry 380 of FIG. 3D illustrates such a DNS entry, in the format <site>.RFID.<domain>. In step 320, RFID devices request middleware servers. Here, the RFID devices transmit requests for middleware servers to assigner 245. Assigner 245 determines that RFID devices A and C will be associated with middleware server 220 and RFID device B will be associated with middleware server 215 (step 325).

In step 330, middleware servers update the DNS entry for each RFID device with identification information for the middleware server. In this example, the DNS entry for each RFID device is updated with a TXT record that states the domain name of the associated middleware server. Accordingly, TXT record 385 ("TXT mw-srv-1.W14.RFID.cisco.com") is added to DNS entry 355 for RFID device A. Similarly, TXT record 390 ("TXT mw-srv-2.W14.RFID.cisco.com") is added to DNS entry 360 for RFID device B and TXT record 395 ("TXT mw-srv-1.W14.RFID.cisco.com") is added to DNS entry 365 for RFID device C. Preferably, the same procedure applies if an RFID device is added/replaced after other RFID devices in the network have been initialized, provisioned, etc., as described above.

Assigner 245 could be implemented in various ways, e.g., as a stand-alone device, as hardware and/or software incorporated into a module of another network device, etc. The network device could be, for example, a switch (e.g., a Catalyst 6500 switch provided by Cisco) or a middleware server.

In this example, assigner 245 is a type of load balancer. However, assigner 245 preferably does not re-allocate RFID devices to other middleware servers as frequently as a normal TCP load balancer would re-route network traffic. Instead, assigner 245 preferably re-allocates RFID devices to other middleware servers only when certain conditions exist, e.g., when devices boot up, during a maintenance cycle, when middleware servers are added to the network, etc. Otherwise, the associations between middleware servers and RFID devices would frequently change and the new associations would need to be communicated to other parts of network 200 (e.g., to application server 205).

According to some implementations, the protocol used for the query/response between the RFID device and the assigner differs from the protocol used in routine communications on the RFID network. In some such implementations of the load balancer described herein, the protocol is one used by conventional TCP load balancers. The RFID device may or may not know about the separate existence of the load balancer. In some preferred implementations, the RFID device treats the load balancer as the RFID middleware server.

Figure 4:
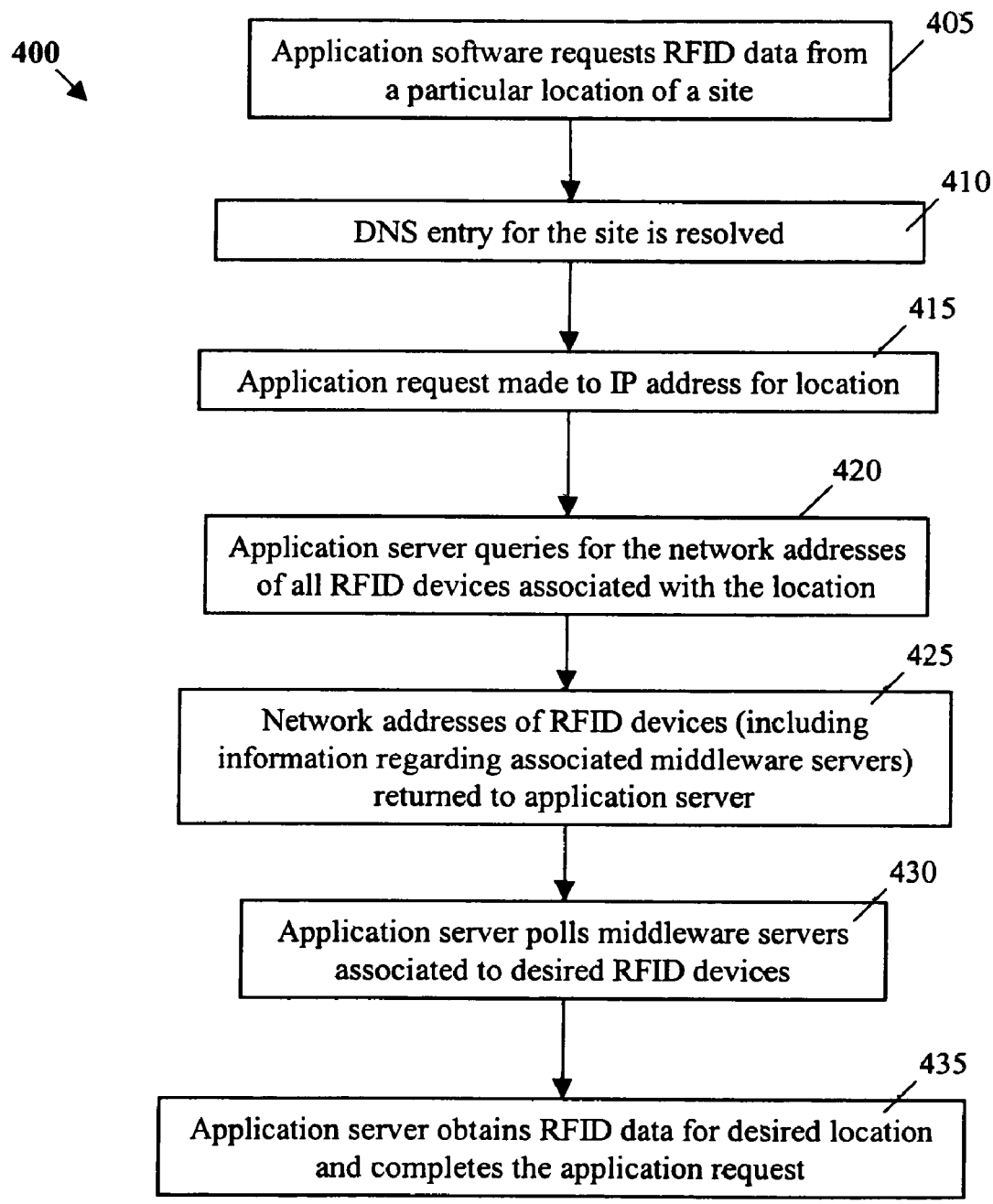
FIG. 4 is a flow chart that provides an overview of another method of the present invention.

FIG. 4 is a flowchart that outlines method 400 for obtaining RFID data from a location according to some implementations of the present invention. In step 405, application software 210 requests RFID data from a location. In this example, the location is location 235, which is a door of Warehouse 14. The DNS entry 380 for this site is resolved (step 410) and an application request is made for the IP address for W14, Door 235 (step 415).

In response, application server 205 queries for the network addresses of all RFID devices deployed at door 235, e.g., "*.Door235.W14.RFID.cisco.com." (Step 420.) (The asterisk here signifies a search for all entries that match or have entries related to Door 235.) Network addresses for these RFID devices (including the TXT records that indicate associated middleware servers) are returned to application server 205 (step 425). Accordingly, the application server now knows the middleware server associated with each RFID device deployed at door 235 of Warehouse 14. The application server can then poll these middleware servers (step 430) in order to obtain RFID data for door 235 and complete the application request. (Step 435.)

Figure 5:
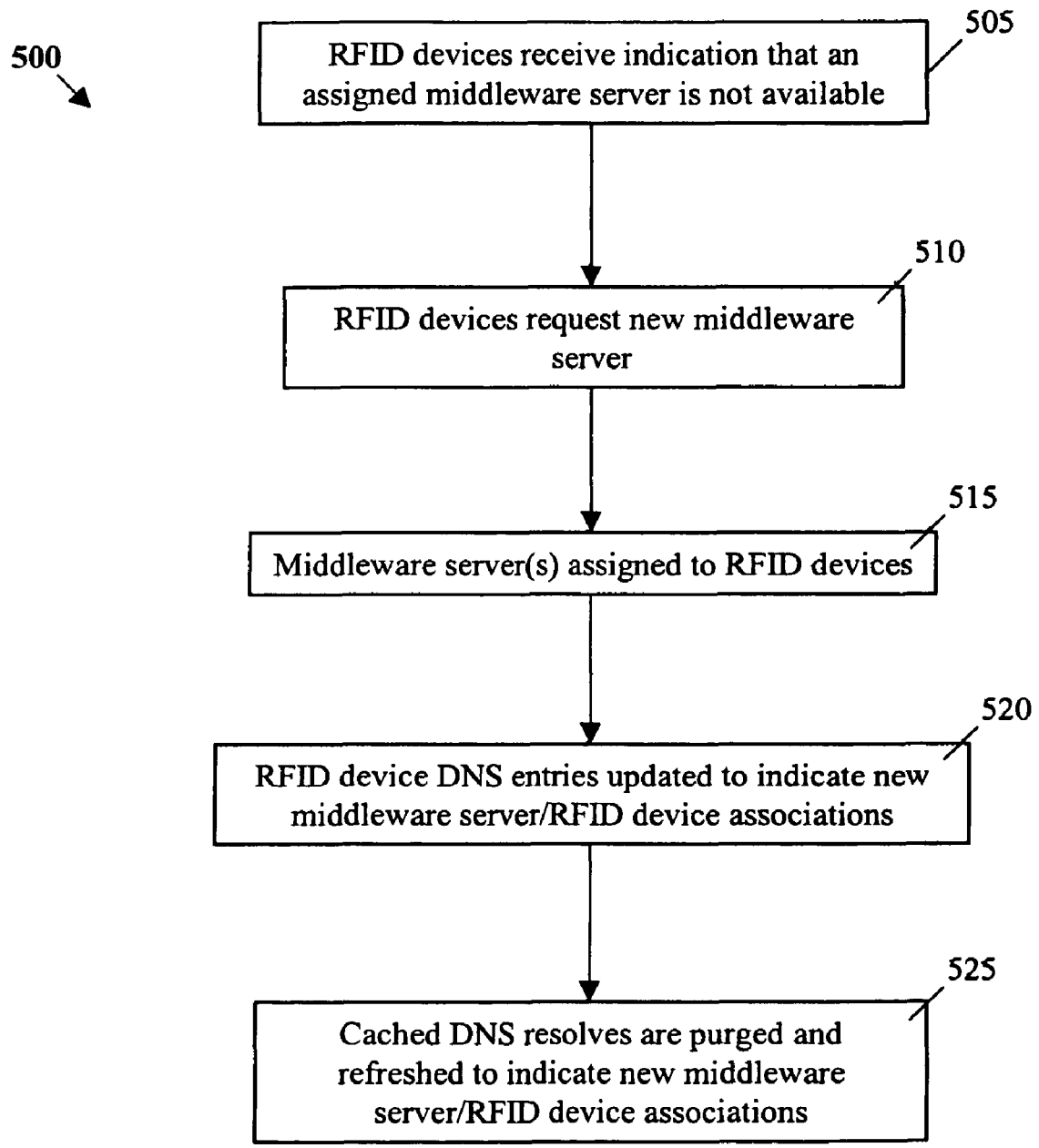
FIG. 5 is a flow chart that provides an overview of still another method of the present invention.

Some methods of the present invention provide for redundancy of middleware servers and dynamic re-assignment of RFID devices from an unavailable middleware server to one or more available middleware servers. The flow chart of FIG. 5 outlines one such method 500 according to the present invention. Method 500 begins after RFID devices and associated middleware servers have previously been initialized, provisioned according to the present invention. For example, such devices may be in the condition that would exist upon completion of step 330 of method 300.

In step 505, one or more RFID devices receive an indication that a middleware server with which they had been associated will no longer be available. This indication could manifest in many ways. For example, before taking a middleware server off line for maintenance and/or a software upgrade, a network administrator could send a signal to the RFID devices indicating that the middleware server is no longer available. Alternatively, the RFID devices may simply determine that a previously-established connection with the middleware server has gone down. In this example, middleware server 220 has been taken off line and RFID devices A and C determine that their connection with middleware server 220 has gone down. Similarly, RFID devices at other locations of site 225 also determine that their connection with middleware server 220 has gone down.

In response, the RFID devices request another middleware server (step 510). RFID devices A and C may, for example, send a second middleware server request to assigner 245. In step 515, assigner 245 assigns an available middleware server to each of the RFID devices that have sent a second middleware server request. In this example, middleware servers 270 and 280 are both available. Assigner 245 assigns middleware servers in an appropriate fashion, e.g., taking into account the current demands of middleware servers 270 and 280.

In this example, middleware server 270 is assigned to RFID device A and middleware server 280 is assigned to RFID device C. Accordingly, TXT entries 385 and 395 in DNS table 350 (corresponding to RFID device A and C, respectively) are updated to indicate the new middleware server/RFID device associations. (Step 520.) Here, entries 385 and 395 are revised to read "TXT mw-srv-3.W14.RFID.cisco.com." Other RFID devices of site 225 that were previously assigned to middleware server 220 are assigned either to middleware server 270 or 280 and their corresponding TXT entries are also updated.

Other components of network 200 need to be made aware of the new RFID device/middleware server associations. For example, the cached DNS resolves of application server 205 corresponding to the prior RFID device/middleware server associations need to be purged and the caches need to be refreshed with the new RFID device/middleware server associations (step 525). In some implementations, when an application server can no longer communicate with a middleware server and/or an RFID device, the application server will make a query for the device and use the results of this query to refresh its cache of DNS entries.

Alternatively (or additionally), purging and refreshing of cashed DNS resolves is controlled by a time to live ("TTL") indication received from a middleware server with the RFID device/middleware server associations. According to some such alternative implementations, after the TTL has run the application server makes a query for RFID device/middleware server associations and uses the results of this query to refresh its cache of DNS entries.

If middleware server 220 is later brought back on line, it could be initialized, provisioned, etc. (e.g., as described above). In some implementations, middleware server 220 notifies assigner 245 that it is back online and assigner 245 updates a table/database of available middleware servers for site 225. RFID devices could subsequently be assigned to middleware server 220, e.g., as described above.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can transport the products through a door that has multiple RFID readers deployed nearby. The readers may be virtualized and data from the virtualized readers may be obtained by application software. For example, the application software may obtain EPC information regarding the products and can use this information to update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that are relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 6:
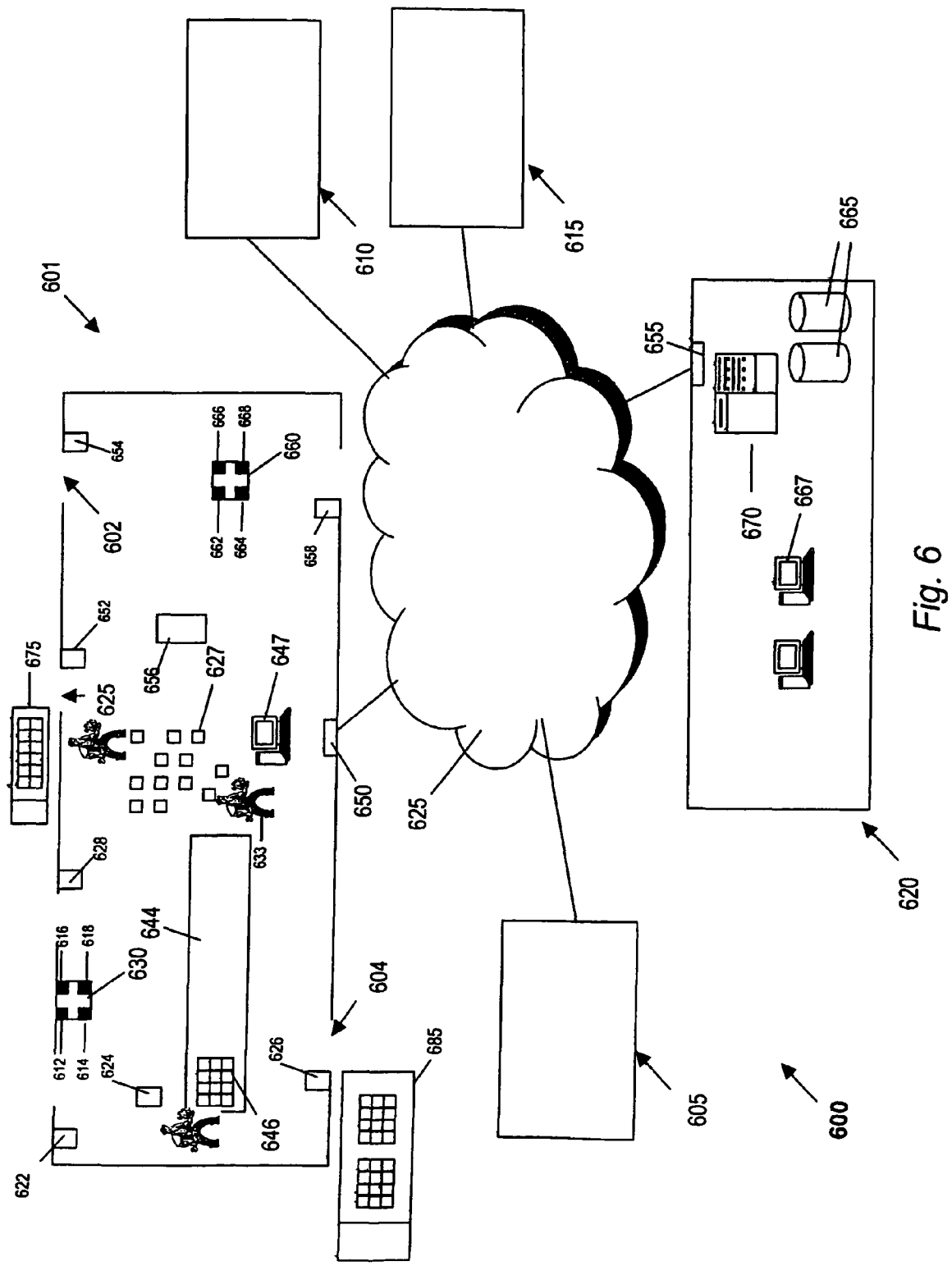
FIG. 6 illustrates an exemplary RFID network according to the present invention.

Some aspects of the invention use a combination of EPC code information and combine them with versions of existing networking standards for identifying, locating and provisioning RFID devices, such as RFID readers and RFID printers, that are located in a network. An example of such a network is depicted in FIG. 6. Here, RFID network 600 includes warehouse 601, factory 605, retail outlet 610, financial institution 615 and headquarters 620. As will be appreciated by those of skill in the art, network 600 could include many other elements and/or multiple instances of the elements shown in FIG. 6. For example, network 600 could include a plurality of warehouses, factories, etc.

In this illustration, products 627 are being delivered to warehouse 601 by truck 675. Products 627, which already include RFID tags, are delivered through door 625. In this example, RFID reader 652 is connected to port 662 of switch 660. Here, switches 630 and 660 are connected to the rest of RFID network 600 via gateway 650 and network 625. Network 625 could be any convenient network, but in this example network 625 is the Internet. RFID reader 652 reads each product that passes through door 625 and transmits the EPC code corresponding to each product on RFID network 600.

RFID tags may be used for different levels of a product distribution system. For example, there may be an RFID tag for a pallet of cases, an RFID tag for each case in the pallet and an RFID tag for each product. Accordingly, after products 627 enter warehouse 601, they are assembled into cases 646. RFID printer 656 makes an RFID tag for each of cases 646. In this example, RFID printer 656 is connected to port 666 of switch 660. RFID printer 656 could operate under the control of PC 647 in warehouse 601, one of PCs 667 in headquarters 620, or some other device.

RFID reader 624, which is connected to port 614, reads the EPC code of each case 646 and product 627 on conveyor belt 644 and transmits this information on network 600. Similarly, RFID reader 626, which is connected to port 616, reads the EPC code of each case 646 and product 627 that exits door 604 and transmits this information on network 600. Cases 646 are loaded onto truck 685 for distribution to another part of the product chain, e.g., to retail outlet 610.

Each of the RFID devices in network 600 preferably has a "personality" suitable for its intended use. For example, device 652 could cause reassuring tone to sound and/or a green light to flash if an authorized person or object enters door 625. However, device 652 might cause an alarm to sound and/or an alert to be sent to an administrator on network 600 if a product exits door 625 or an unauthorized person enters or exits door 625.

Figure 7:
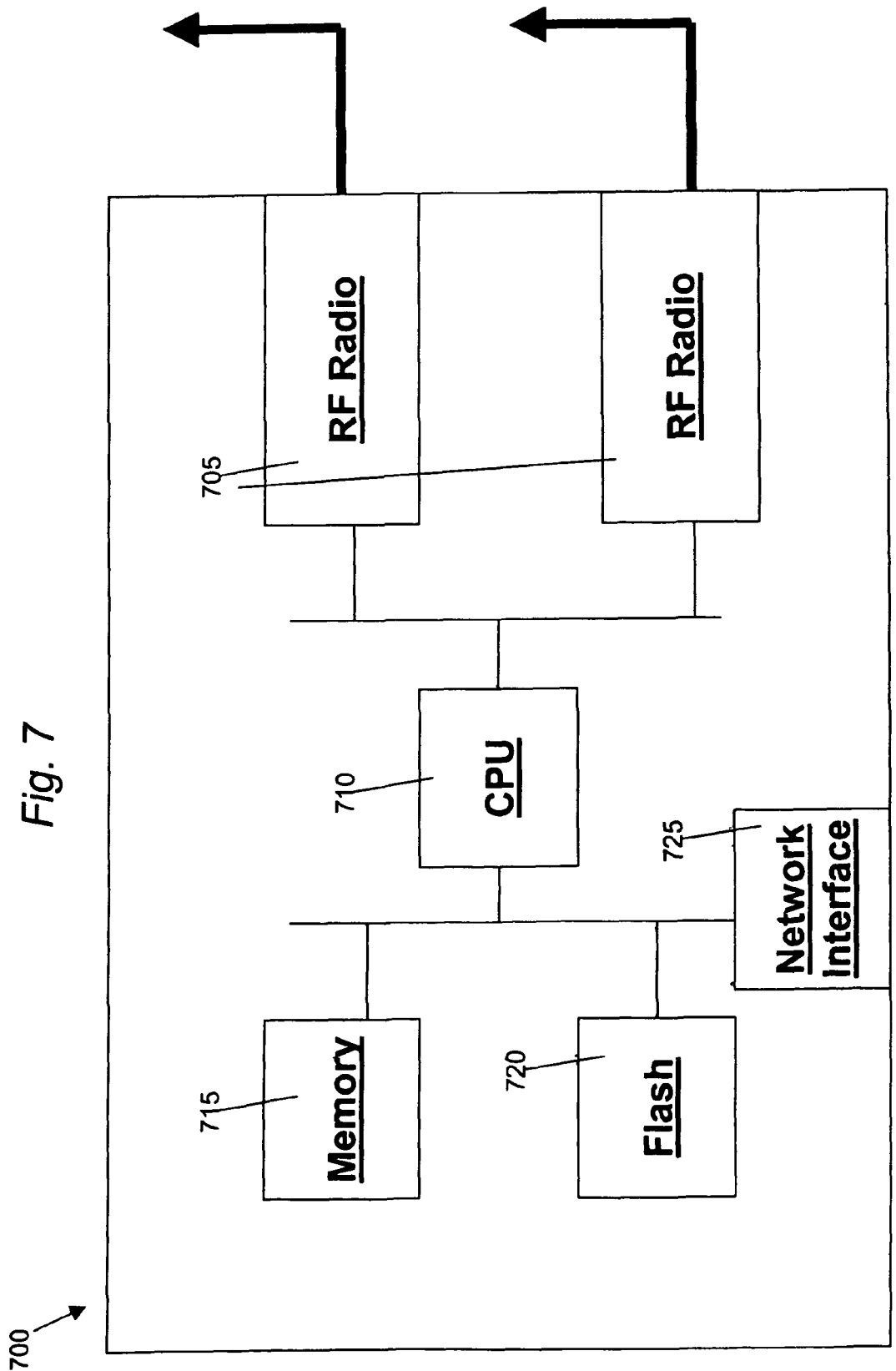
FIG. 7 is a block diagram of an exemplary RFID reader that may be configured to perform some methods of the present invention.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 provide raw RF data that is converted by an analog-to-digital converter (not shown) and conveyed to other elements of RFID reader 700. In some embodiments, these data are stored, at least temporarily, by CPU 710 in memory 715 before being transmitted to other parts of RFID network 600 via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests, as described below with reference to FIG. 6, to initiate a provisioning/configuration cycle. In some implementations, flash memory 720 is used to store personality information and other configuration information obtained from, e.g., a DHCP server during such a cycle.

However, in preferred implementations, such information is only stored in volatile memory 415 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 715. Updates may be instigated by the central server or selected, trusted devices. New versions of the image file (e.g., the running, base image necessary to operate the RFID device) are copied into flash memory 720. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 8:
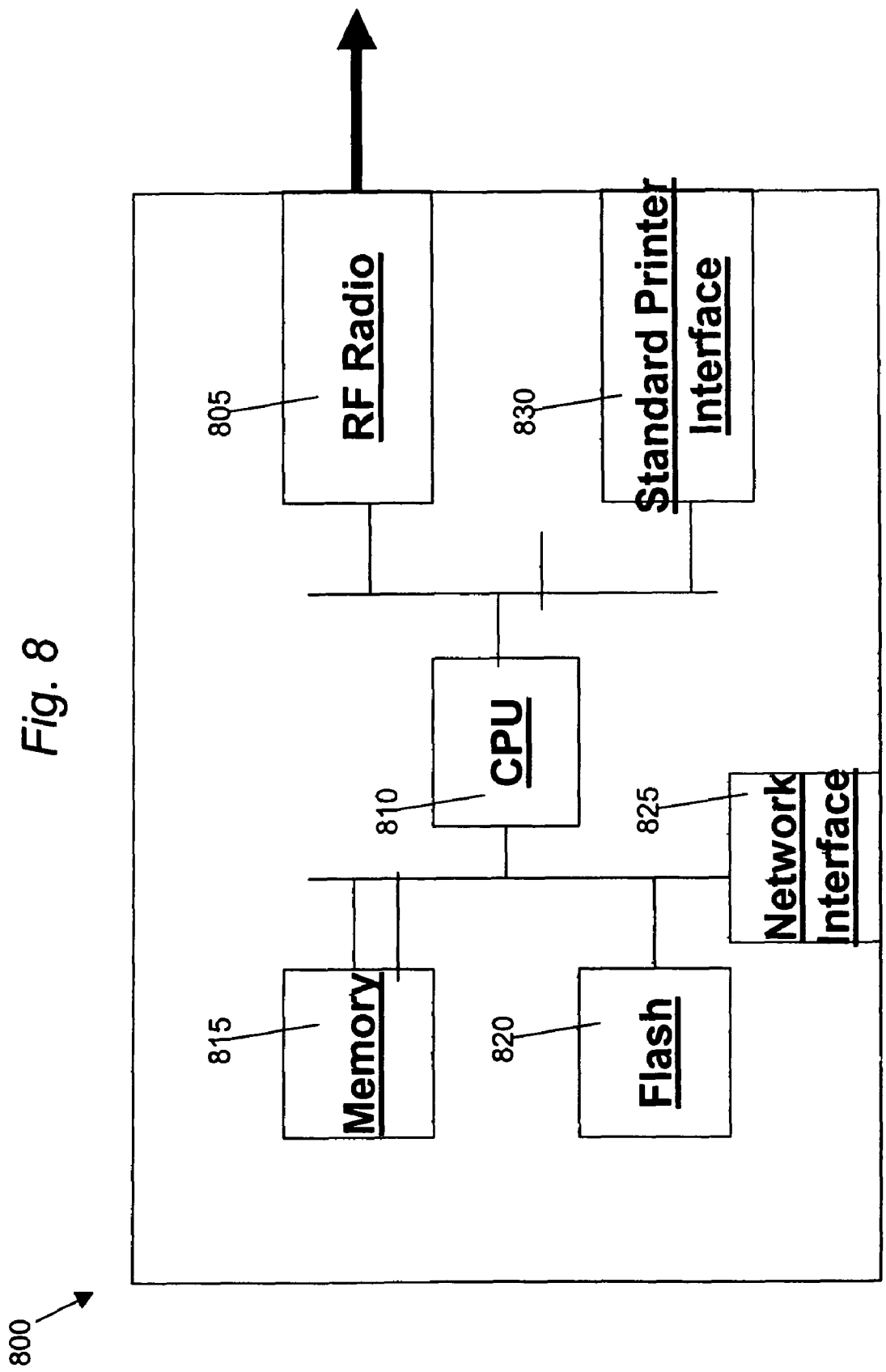
FIG. 8 is a block diagram of an exemplary RFID printer that may be configured to perform some methods of the present invention.

FIG. 8 is a block diagram illustrating an exemplary RFID printer 800 that may be configured to perform some methods of the present invention. RFID printer 800 has many of the same components as RFID reader 700 and can be configured in the same general manner as RFID reader 700.

RFID printer also includes printer interface 830, which may be a standard printer interface. Printer interface prints a label for each RFID tag, e.g. according to instructions received from network 200 via network interface 825.

RF Radio 805 is an outbound radio that is used to send RF signals to the antenna of an RFID tag under the control of CPU 810, thereby encoding information (e.g. an EPC) on the tag's microprocessor. Preferably, RF Radio 805 then checks the encoded information for accuracy. The RFID tag is sandwiched within the label produced by printer interface 830. Those of skill in the art will realize that the generalized diagram of FIG. 8 will also apply to RFID writers, which are typically high-speed devices that encode the RFID tags on manufacturing lines.

Figure 9:
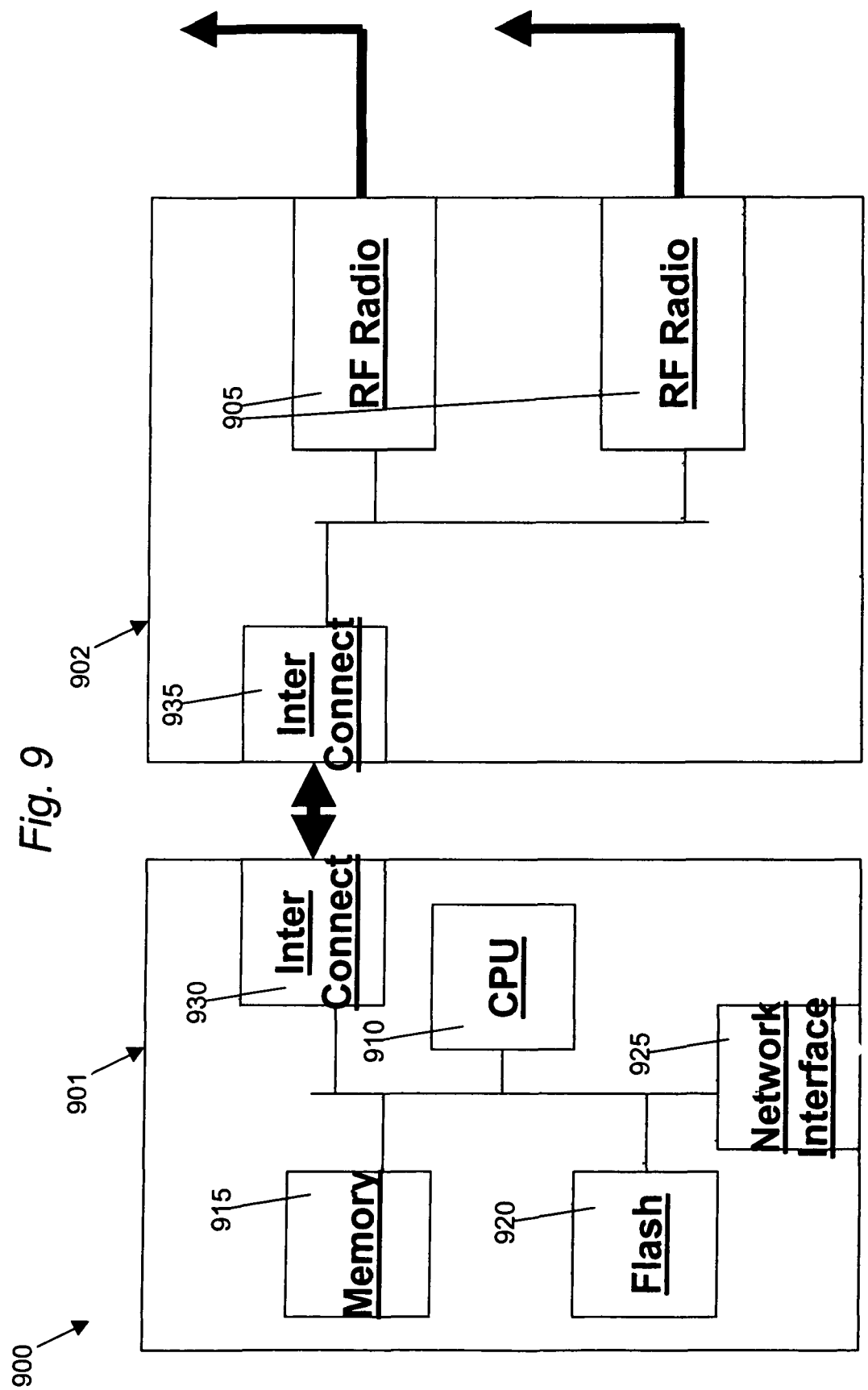
FIG. 9 is a block diagram of an exemplary RFID system that may be configured to perform some methods of the present invention.

FIG. 9 illustrates RFID system 900 that includes control portion 901 and RF radio portion 902. The components of control portion 901 are substantially similar to those described above with reference to FIGS. 7 and 8. Interconnect 930 of control portion 901 is configured for communication with interconnect 935 of RF radio portion 902. The communication may be via any convenient medium and format, such as wireless, serial, point-to-point serial, etc. Although only one RF radio portion 902 is depicted in FIG. 9, each control portion 901 may control a plurality of RF radio portions 902. RFID system 900 may be deployed on a single framework or chassis (e.g., on a forklift) or in multiple chassis.

Figure 10:
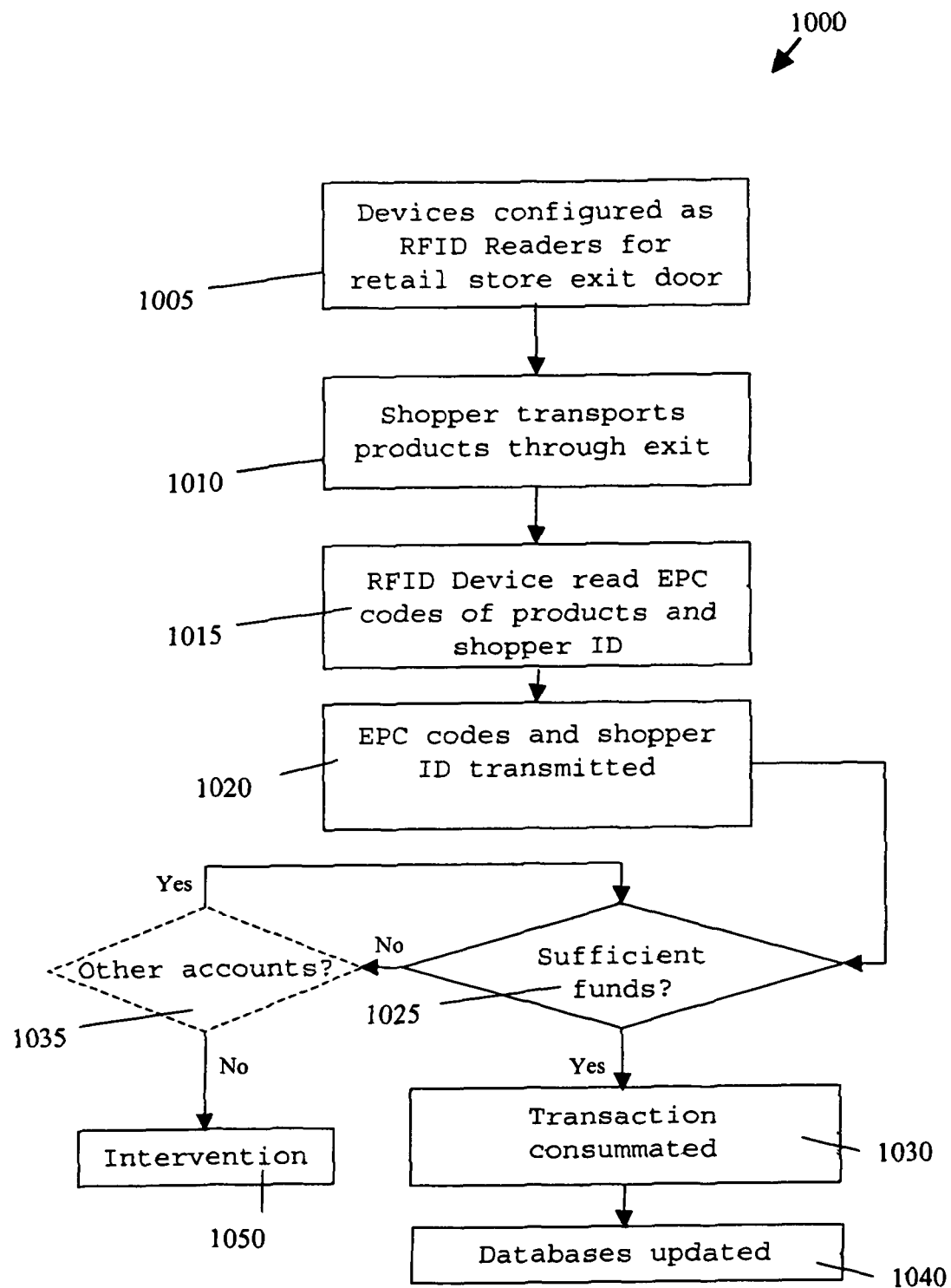
FIG. 10 is a flow chart that provides an overview of some implementations of the present invention.

FIG. 10 is a flow chart that illustrates an exemplary business application of the present invention. Those of skill in the art will appreciate that the example described below with reference to FIG. 10 is but one of many applications of the invention.

In step 1005, a plurality of RFID devices have been provisioned according to one of the previously-described methods. The condition of the RFID network is comparable to that of step 330 in method 300, shown in FIG. 3A and described above. In this example, the RFID devices are RFID readers that are positioned near an exit door of a retail store. Therefore, in the previous steps, the devices have been provisioned with a personality that is appropriate for their role.

In step 1010, a shopper exits the door with a number of selected products. In step 1015, the RFID readers read the RFID tags of each product and extracts the EPC codes and related product information (e.g., the price of each product). Redundant RFID data may be filtered at any convenient part of the network, e.g., by middleware or by application software.

In this example, the RFID readers also read an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 1020, the RFID readers transmit the product information, including the EPC codes, on the RFID network. In this example, the information is sent (e.g., according to instructions in application software) to a financial institution indicated by the shopper's RFID tag.

In step 1025, the financial institution that maintains the shopper's selected account determines whether there are sufficient funds (or whether there is sufficient credit) for the shopper to purchase the selected products. If so, the shopper's account is debited and the transaction is consummated (step 1030).

In this example, the shopper has the option of designating one or more alternative accounts. Accordingly, if the first account has insufficient funds or credit, it is determined (e.g., by a server on the RFID network) whether the shopper has indicated any alternative accounts for making purchases (step 1035). If so, the next account is evaluated in step 1025. If it is determined in step 1035 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) are transmitted on the RFID network. For example, this information is preferably forwarded to one or more devices on the RFID network that are configured to update one or more databases maintained by the retail store or the manufacturers/producers, distributors, wholesalers, etc., of the purchased products (step 1040). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Figure 11:
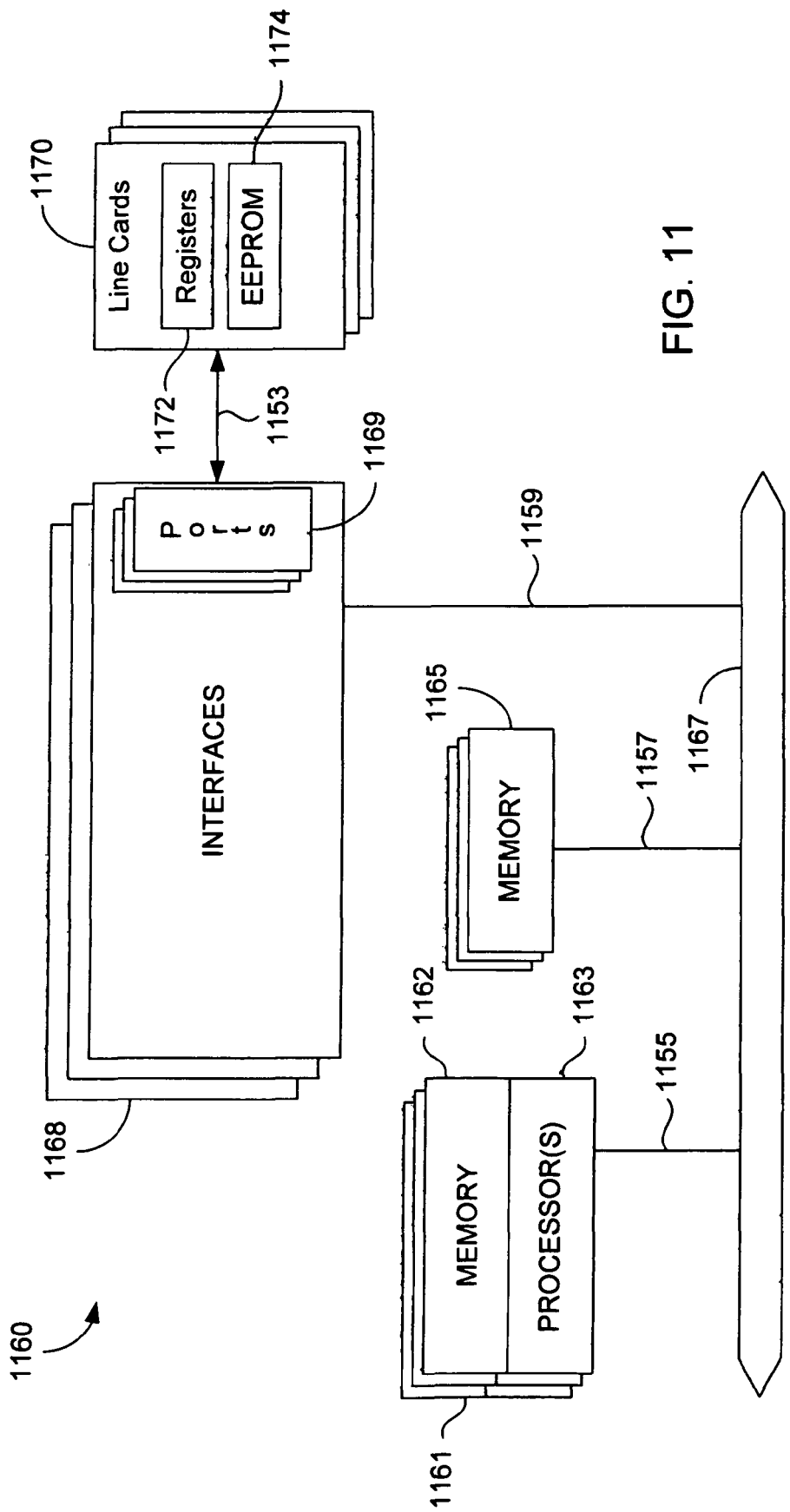
FIG. 11 illustrates an example of a network device that may be configured to implement some methods of the present invention.

FIG. 11 illustrates an example of a network device that may be configured to implement some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor 1174 and, in some instances, volatile RAM. Independent processors 1174 may be, for example ASICs or any other appropriate processors. According to some such embodiments, these independent processors 1174 perform at least some of the functions of the logic described herein. In some embodiments, one or more of interfaces 1168 control such communications-intensive tasks as media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "line cards"). Generally, interfaces 1168 control the sending and receiving of data packets over the network and sometimes support other peripherals used with the network device 1160. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system (e.g. Linux, VxWorks, etc.), and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 11) or switch fabric based (such as a cross-bar).

According to some methods of the invention, logical device definitions can be concatenated to include devices having two or more levels of logical device definitions. For example, some implementations of the invention include multiple controllers that appear to a middleware server as components of a first logical reader. A controller (or each of a plurality of controllers) may aggregate a group of RFID readers and/or components of RFID readers as a second logical reader. Physical devices other than RFID readers may be logically aggregated. Other physical devices that may be aggregated include, but are not limited to, controllers and storage devices. Aggregated RFID readers and controllers can provide current RFID data. Storage device may provide historical RFID data. Therefore, including storage devices as part of logical device aggregations allows the formation of logical devices that can provide both past and current RFID data.

Figure 12:
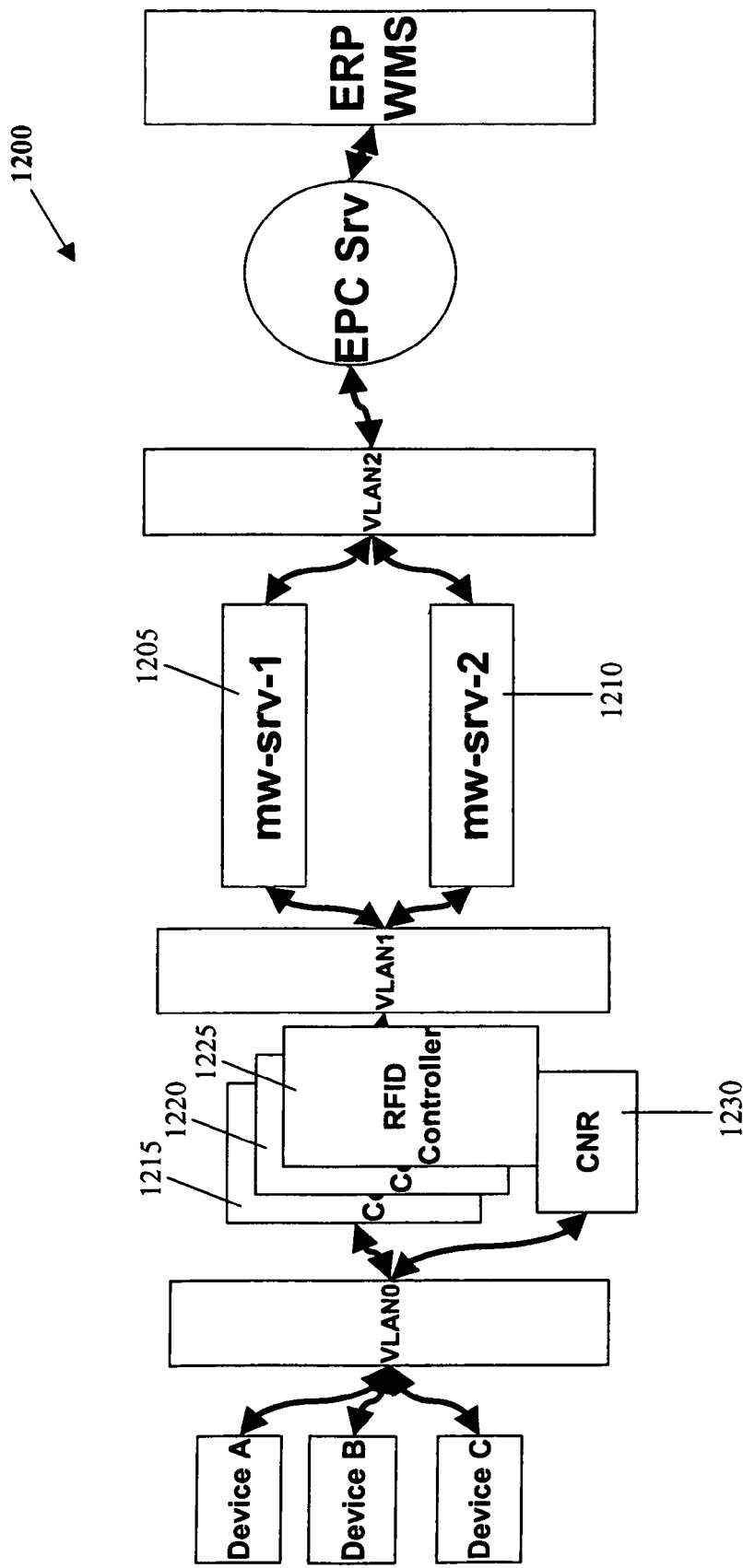
FIG. 12 is a block diagram illustrating a simplified portion of an RFID network that may be used to implement aspects of the present invention.

Some such implementations will now be described with reference to FIGS. 12 through 14. FIG. 12 illustrates a portion of an RFID network 1200 that is substantially similar to network 200 of FIG. 2. In FIG. 2, each of the readers has a 1 to 1 communication with an assigned middleware server. This is true even though the communications are conducted via VLANs 242 and 250. The previous discussions provided examples of multiple readers (logical or physical) mapped to one assigned middleware server.

Previously deployed logical readers were in the context of one middleware server, typically by spanning closely deployed physical readers (e.g., at a single dock door). EPCGlobal currently does not have any mechanism to define logical readers that span multiple middleware servers or controllers. If one were to define a logical reader on two middleware servers according to conventional methods, it would not be successful. One of the middleware servers would open up a session with a reader. According to the EPCGlobal specification, a reader is only allowed to have one middleware session. Therefore, according to conventional methods there is no way to open a session with the second middleware server, much less with a potentially large number of middleware servers.

Returning to FIG. 12, only middleware servers 1205 and 1210 are illustrated, but it will be appreciated by those of skill in the art (after perusal of this application) that any convenient number of middleware servers may be used. One significant difference between network 200 and network 1200 is that the latter includes controllers 1220 and 1225, which act as intermediaries between RFID devices (e.g., RFID readers) and middleware servers.

Controllers may be implemented in a variety of ways. For example, a controller may be independent software run on standard computers and/or industrial computers. Alternatively, or additionally, the control functions may be incorporated into networking equipment (e.g., Ethernet switches or routers). Some portions of the logic may be implemented via logic devices such as FPGAs or ASICs.

Figure 12A:
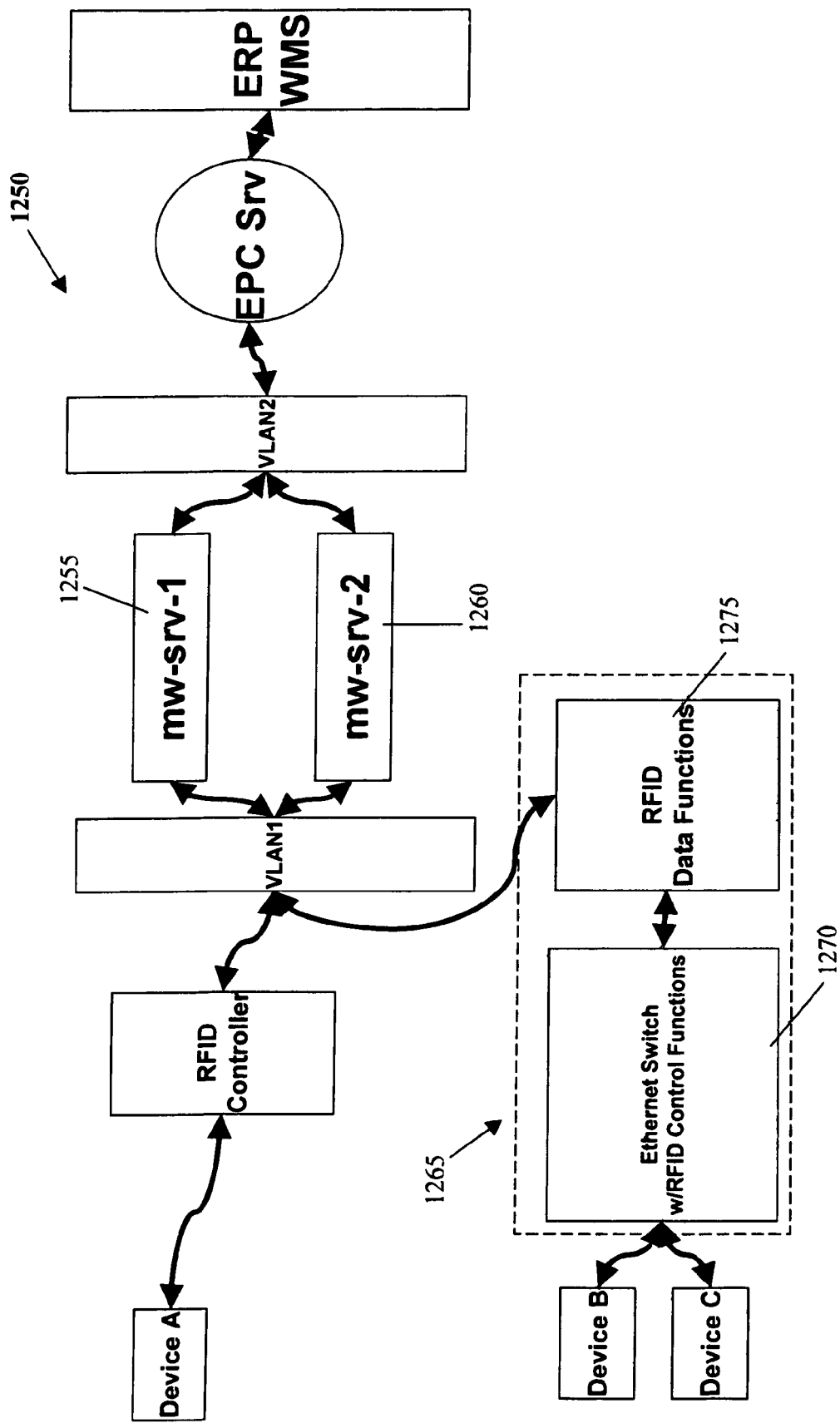
FIG. 12A is a block diagram of a simplified portion of an RFID network having an exemplary controller that may be configured to perform some methods of the present invention.

A controller's data-related functions and control functions may be implemented in the same device or in different devices. For example, in network configuration 1250 of FIG. 12A, the control functions of controller 1265 are implemented via an Ethernet switch. However, the data storage and data manipulation functions are performed by PC 1275. Such functions may, of course, be performed by other devices. For example, the data storage and/or data manipulation functions may be performed in a minicomputer or in a mainframe environment.

Interposing controllers between RFID devices and middleware servers allows another layer of abstraction to be implemented: logical interfaces/logical readers can be implemented at the controller level. The virtual interface can be defined at a higher level, e.g., at the middleware server level.

For example, in the cluster of controllers 1215, 1220 and 1225 illustrated in FIG. 12, logical interfaces from multiple controllers can be logically aggregated once again to create one example of what is sometimes referred to herein as a "virtual interface" (or the like) at the middleware level or higher. In this example, what appears to a middleware server as a logical interface is really a virtual interface, which may have yet another level of underlying logical interfaces.

In other words, per controller, one could define a logical interface that includes multiple physical devices and/or components of physical devices. For example, one or more individual antennas of an RFID reader may form part of a logical device that spans multiple physical devices. However, these all involve one-to-one mappings between one such physical device/component and a single controller.

However, VLAN 1235, which provides communication between RFID devices and controllers, could include many more devices than indicated in FIG. 12. Moreover, VLAN 1235 could span a considerable distance. Therefore, even the logical devices defined at the controller level could include RFID devices (or components thereof) aggregated across a considerable distance.

A virtual reader can include such logical readers, which are "recursed," e.g., according to ECSpec, to obtain physical readers/antennas. Accordingly, a virtual reader can be part of a multi-controller group or a multi-middleware group, while operating within the current requirements of EPCGlobal regarding logical devices. Such implementations allow a much wider breadth of information gathering across the network.

Logical readers and virtual readers may be implemented in various ways. For example, a virtual reader can be created in an EPCIS/WMS or ERP system table, a hard coded database table that maps logical readers to a virtual reader. Alternatively, a Virtual Reader could be created in a publish/Subscribe bus system, wherein logical readers would join a virtual reader group for data exchange. A virtual reader can also be created as part of a multi-controller unit definition, e.g., using Cisco's AONS® system or on a dedicated data aggregator.

In preferred implementations of the invention, logical readers and virtual readers are implemented, at least in part, in a dynamic and automated fashion. The existing manual method of creating an EPCIS/WMS or ERP system table would work, but would potentially be much more labor-intensive. Moreover, the resulting table is in a particular, proprietary format. If another entity wishes to use the data, the table would need to be re-populated. For example, a customer changes from a J. D. Edwards system to a PeopleSoft systems, the table would need to be re-defined and re-populated.

In some preferred implementations of the invention, logical readers and virtual readers are implemented, at least in part, via DNS entries. In contrast to manual methods, these DNS-based methods can be implemented to provide desired RFID data in response to a function call from any one of many commercially available software packages. Some exemplary implementations of this type will now be described with reference to FIGS. 13-15.

Figure 13:
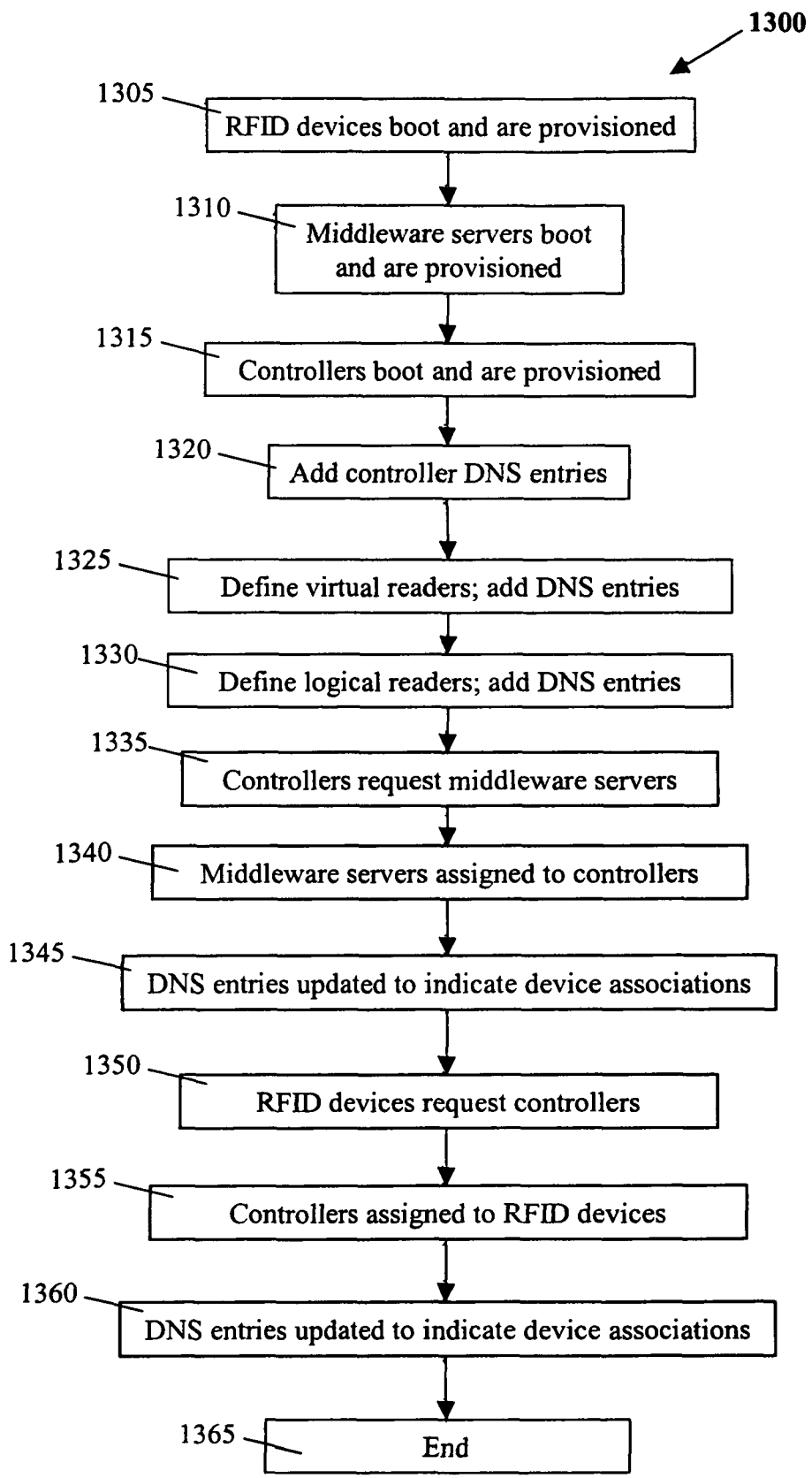
FIG. 13 is a flow chart that provides an overview of some implementations of the present invention.

In method 1300 of FIG. 13, steps 1305 and 1310 may be performed in substantially the same manner described above with reference to steps 305 and 310 of method 300: RFID devices A, B and C, and middleware servers 1205 and 1201, initialize and are provisioned. This process is preferably performed in a dynamic manner such as that described in the Cross-Referenced Applications. (See, e.g., FIG. 3A and the accompanying description above.)

In this example, DNS entries are formed for the devices as part of this process. After steps 1305 and 1310, the DNS table would appear substantially like table 350 of FIG. 3C. Such a table may be stored, for example, in registrar 1230 of FIG. 12.

In step 1315, the participating controllers initialize and are provisioned. DNS entries for the controllers are added in step 1320. One or more virtual readers may be defined and added to the DNS table. (Step 1325.) After step 1325, the DNS table is populated as shown in table 1400 of FIG. 14. Logical readers are defined and corresponding DNS entries are added in step 1330. Logical readers may be created, e.g. via middleware, via a controller, or via another device.

In the example described above with reference to FIGS. 3A through 3E, method 300 resulted in one-to-one mappings between RFID devices and middleware servers. With controllers interposed between RFID devices and middleware servers, RFID devices need to be assigned to controllers and controllers need to be assigned to middleware servers. Accordingly, in this example assigner 1215 of FIG. 12 is configured to assign RFID devices to controllers and to assign controllers to middleware servers.

The controllers have been provisioned not only with a controller network address, but also with an assigner's network address and with instructions to send the assigner a request for a middleware server. In step 1335, the controllers send the request to the assigner. The assigner assigns a controller to a middleware server in response to the request. (Step 1340.) Similarly, the RFID devices have been provisioned with an RFID device network address, an assigner network address and instructions to send a request to the assigner for a controller. Accordingly, in step 1350 the RFID devices request a controller. The assigner assigns a controller to each of the RFID devices to in response to the request. (Step 1355.)

DNS entries are updated to indicate the RFID device/controller and controller/middleware server associations. (Step 1360.) For example, text entries may be placed under the RFID device entries in a similar fashion to that indicated in FIG. 3E, except that the text entries would indicate associated controllers instead of associated middleware servers. Controller entries can be added in the same way.

At this stage, controllers can appear to middleware servers as virtual readers. Controller 1 of DNS table 1400, for example, could appear to a middleware server as virtual reader VR1. Logical readers can span multiple controllers, but still be associated with a single middleware server. Therefore, EPCGlobal's rules for establishing logical readers are not violated.

The foregoing discussion provides one example of how some aspects the present invention may be implemented at one site. However, some implementations of the invention involve aggregations of logical and physical devices in multiple sites. As explained in more detail below, such aggregations may span large distances and can include physical devices deployed in multiple sites, multiple continents, and/ or anywhere on (or near) Earth.

Moreover, some preferred implementations of the invention involve forming logical devices by aggregating components of a plurality of physical devices. Some such logical devices comprise individual antennae from a plurality of RFID readers.

In addition, some implementations of the invention allow an enterprise to obtain information regarding its products from another entity's RFID network. RFID readers in such networks are sometimes referred to as "federated" readers or the like. For example, a particular food supplier may have products that are stored in and/or being delivered to locations in various parts of the world. Such locations include, for example, warehouses and stores.

Even if one only considers the facilities of a few of the worlds' largest retailers and their associated RFID networks throughout the world, the number of RFID readers, etc, is vast. It would be very convenient for both the food supplier and a large retailer if the food supplier could obtain, e.g., all the RFID tag reads for all the food supplier's chickens across all its distribution centers with the retailer. One could create a virtual reader for this purpose that spans many physical readers, even spanning multiple servers/sites/contexts.

In this example, the food supplier should receive only the data that matches the request, not all data. There may be many other items, e.g., on a pallet of a warehouse that do not relate to the food supplier. Isolating reads of that particular supplier would save a lot of WAN bandwidth. The food supplier could pick up individual items worldwide without overwhelming the communication links with data.

Moreover, retailers would want to prevent suppliers from obtaining RFID tag reads for other companies' products. Such information may include pricing information and other such information that both the retailer and the supplier would want to keep confidential.

Some exemplary multi-site implementations will now be discussed with reference to FIGS. 15 and 16. Network 1500 of FIG. 15 includes sites in various parts of the world. In this example, site A is in Quebec, Canada, site Z is in Alabama, USA and smart reader 1540 is in Taipei, China. The enterprise includes numerous other sites, which are depicted by the dotted line between sites A and Z. Here, communication between sites, headquarters, etc., is performed via Internet 1545, though other communication networks may be used. Such communication may be performed via any method known in the art, preferably via some secure mechanism.

Site A includes middleware servers 1511 and 1513 and multiple controllers. Controllers 1515 and 1517 are illustrated, but site A is a large site and includes many other controllers. RFID readers 1519 and 1521, among others, are assigned to controller 1515, whereas RFID readers 1523 and 1525, among others, are assigned to controller 1517.

Site B includes middleware server 1529, storage device 1531 and controller 1533. RFID readers 1535 and 1537, among others, are assigned to controller 1533.

Very often, a requester will be interested not only in future reads, but also past reads, e.g., within a particular time window. For example, a food supplier employee may want to know not only about current RFID tag reads involving that food supplier's chickens, but also about recent RFID tag reads indicating, e.g., recent deliveries. It is possible to store such data on a storage device and make it available for later retrieval.

There could be, for example, a database maintained in storage devices of location Z (and others). The database could have stored tag reads and associated times and locations. One could use network storage for such data; the storage devices would not need to be in the same location as, e.g., a middleware server.

Some implementations involve requests sent to this database, as if it were another reader. The database could be another "device" defined in a virtual reader group. Instead of a request for "real time" reads, the request could be for all past reads of a certain type, time frame, location(s), etc. These data could be gathered continuously, at predetermined times and/ or in response to instructions.

Reader 1540 is an intelligent reader in Taipei that can communicate via the Internet with EPCIS server 1507 and headquarters 1505. Reader 1540 has sufficient "intelligence" to store and execute middleware 1547, which in this example provides the ALE interface required for communication with EPCIS server 1507. In this example, reader 1540 includes EPCIS interface 1549, but this is not necessary. Reader 1540 (or components thereof) can be put into a virtual reader definition that is made, in this example, at the EPCIS server level.

In some implementations, EPCIS server 1507 can communicate with reader 1540 via a secure DNS transaction. After proper authentication, one could query reader 1540's DNS and determine whether there have been any updates to reader 1540's site.

Previously, having a logical reader has meant that one has a middleware server between the EPCIS server and the reader. However, if one has an intelligent reader, this need not be the case. We can aggregate data between middleware servers and intelligent readers. Moreover, we can define virtual readers at the EPCIS server level (1507). This allows aggregation of data from multiple sites and at different levels of the network hierarchy.

In this example, a user using software of an ERP system at corporate headquarters 1505 issues a business level command: "get me Foo." Foo could be anything, but in this example is a request for information about the products of a particular enterprise, such as a particular food supplier's chickens, the toilet paper of a particular paper products company, etc. Specifically, the request is for RFID tag reads of a particular food supplier's chickens from particular antennae of RFID readers, examples of which are circled in FIG. 15.

This business level command (in this example, an ERP request) is sent to an EPCIS server, which could be one of many. In the future, EPCIS server 1507 could be part of an ERP/WMS system at headquarters 1505, but for now EPCglobal defines the EPCIS server as a separate device. The EPCIS server's main goal is to take a business level request and translate it into an RFID level request. (Step 1603.) In this example, the EPCIS server sends requests A through Z, one request to at least one middleware server in each of the 26 locations. At least some of these requests involve pre-defined virtual readers. A similar request is sent to reader 1540.

Each of the middleware servers receives the request (step 1605) and translates it to a reader request according to ECSpec. (Step 1610.) To middleware server 1511 of site A, controller 1515 may seem to be, e.g., reader X of dock door 4 and controller 1517 may seem to be, e.g., reader Y of dock door 4. Middleware server 1511 (and other middleware) contacts the devices that appear to comprise the virtual reader and requests RFID data. (Step 1615.)

Controller 1515 and controller 1517 will map the request to a logical reader definition (step 1620) that may involve multiple physical devices and/or components thereof. Here, controllers 1515 and 1517 return reads from the circled antennas of readers 1519, 1521, 1523 and 1525. (Step 1625.)

This exemplary implementation allows a combination of real-time and non-real time data gathering, if desired. In other words, the defined virtual reader can include devices for obtaining both current/real-time RFID tag reads and stored reads. For example, in a database created and stored at the middleware level (e.g., storage device 1531 of location Z), RFID tag reads may have been accumulating according to previous instructions. These data may be organized, e.g., according to what logical or physical reader read an RFID tag, at what time and at what location.

When a virtual reader is created, such storage devices could be mapped as logical readers that have DNS names. When there is a request for data from this logical reader, the storage device will respond with all the appropriate stored data.

Figure 15:
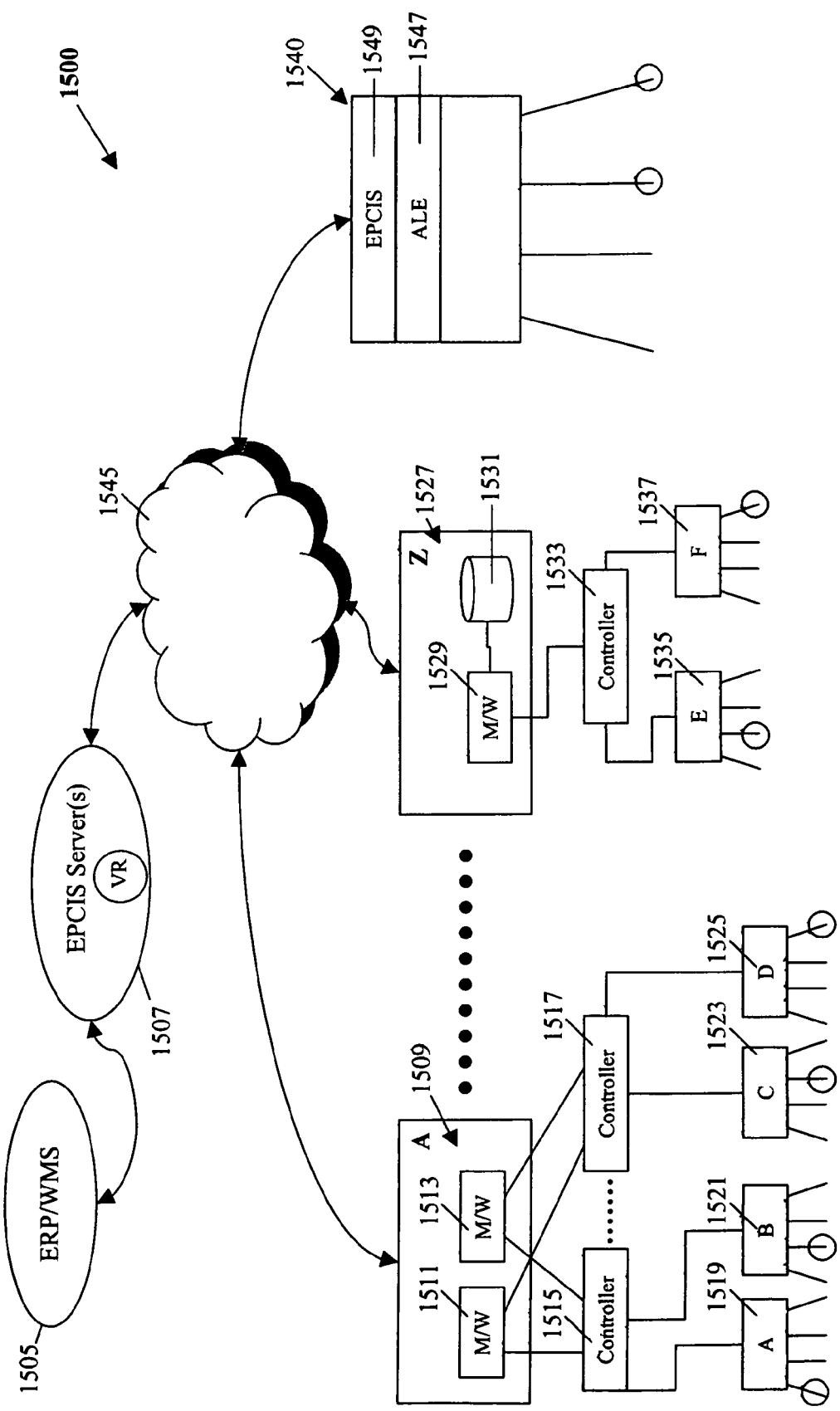
FIG. 15 is a flow chart that provides an overview of some implementations of the present invention.
Figure 16:
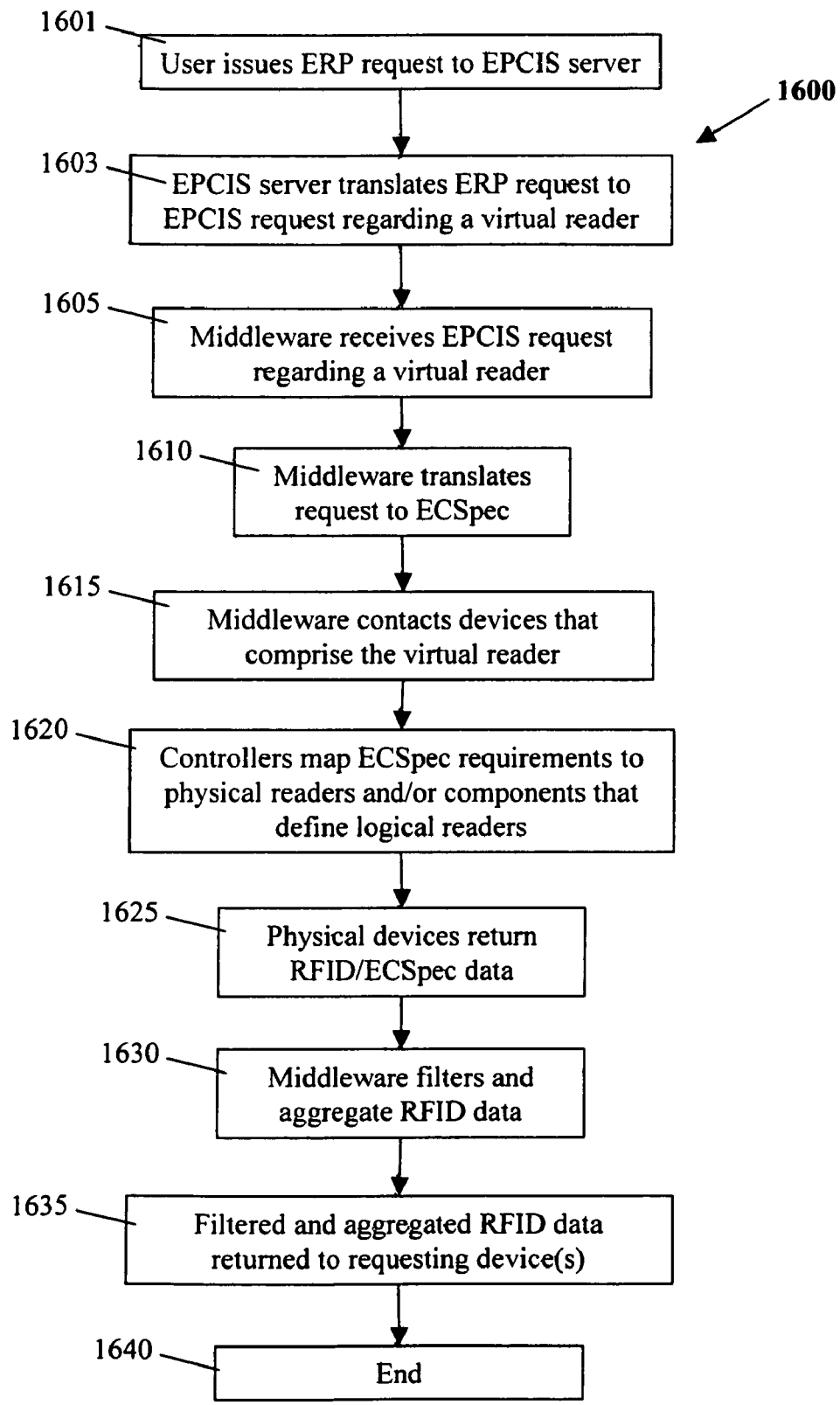
FIG. 16 is a block diagram illustrating another simplified network that may be used to implement aspects of the present invention.

Such data could be stored at the middleware level (as shown in FIG. 15), at the WMS (warehouse management system) level, the EPCIS level, or wherever is convenient. In general, storage at the middleware level is best, in order to allow appropriate filtering and data aggregation. However, if one wished to create a non-proprietary method of moving data between an ERP system and a WMS system, one way of doing it would be to create higher-level databases, e.g., at the EPCIS server level.

The role of the middleware still preferably includes filtering, whether the middleware is reader 1540's ALE software or functions of a middleware server. This filtering allows for the extraction of "Foo," (in this example, a food supplier's chicken reads) from all the other reads of the circled antennas of the designated locations. (Step 1630.) The middleware then returns filtered and aggregated RFID data to the requesting device, which is EPCIS server 1507 in this instance.

EPCIS server 1507 translates the data into a format understood by the business software and returns the RFID data to headquarters 1505.

There present invention provides many useful and valuable solutions to existing problems. Some examples apply to the context of product recalls. Suppose a pharmaceutical company has a recall. The company wants to find out where this drug is. Instead of having this functionality sit in an ERP system at the corporate level, where it's all proprietary-based, the present invention allows a command to be sent down to a virtual reader that is defined in DNS: "Give me all reader data that you have at this moment that matches these criteria: drug type, make, date, whatever. As we have seen the request could include both current/real time RFID tag reads and those that have occurred within a predetermined period of time. It could be a very simple command: if there is no match, don't return data. The command can be distributed to all readers in a particular domain (including federated readers, for example) that match the pharmaceutical profile.

It should now be apparent that virtual device definitions could facilitate the targeted retrieval of data to serve many other purposes. Such purposes include, but are not limited to accounting/inventory reconciliation, tracking sales trends by product, location or other criteria, determining materials availability for "just in time" process engineering, tracking the movement of expensive or legally controlled items, etc.

Virtual reader definitions can be linked to (and can expand upon) RFID reader role and personality definitions. For example, one could aggregate reads according to device role/personality to receive reads from compactors, dock doors, etc. Such reads could also be obtained according to location, as discussed herein and in the Cross-Referenced Applications. Accordingly, data could be aggregated and filtered based upon a combination of such features, e.g., personality and location (all dock doors at location X, all dock doors in Latvia, etc.)

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

For example, while the present invention involves methods and devices for identifying and provisioning individual RFID devices in a network, many aspects of the present invention can be applied to identifying and provisioning other types of devices in a network. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

Accordingly, the present embodiments are to be considered as illustrative and not restrictive, and the invention is not to be limited to the details given herein, but may be modified within the scope and equivalents of the appended claims.

We claim:

1. A networking method, comprising:
receiving, from a requesting device, a first request for information regarding a virtual radio frequency identification ("RFID") reader;

translating the first request into second requests for data from a first plurality of devices aggregated as a first logical RFID reader, the first plurality of devices comprising a first plurality of controllers;

wherein a plurality of physical RFID readers are associated with the first plurality of controllers by automatically updating a domain name server (DNS) entry of each of the plurality of RFID readers such that the DNS entry identifies a domain name of a corresponding one of the first plurality of controllers;

wherein the first plurality of controllers are associated with one or more middleware servers by automatically updating domain name server ("DNS") entries;

sending at least one of the second requests to the first plurality of controllers;

receiving RFID data from the first plurality of controllers responsive to the second requests; and sending at least some of the RFID data to the requesting device in response to the first request.

2. The method of claim 1, wherein each of the first plurality of controllers translates the second request into a third request for RFID data from a second plurality of devices aggregated as a second logical RFID reader of two or more logical RFID readers, the two or more logical readers including the first logical reader.

3. The method of claim 2, wherein each of the second plurality of devices comprises at least one antenna of an RFID reader.

4. The method of claim 2, wherein the second plurality of devices includes at least one antenna of each of multiple RFID readers aggregated as the second logical RFID reader.

5. The method of claim 1, wherein the RFID data from the first plurality of controllers comprises current RFID tag read data.

6. The method of claim 1, wherein at least one device of the first plurality of devices comprises a storage device, further comprising the step of receiving stored RFID tag read data from the storage device.

7. The method of claim 1, further comprising the step of filtering the RFID data according to parameters of the first request prior to sending at least some of the RFID data to the requesting device.

8. The method of claim 7, wherein the first request comprises a request for information regarding products of a first enterprise and wherein the filtering step comprises filtering out RFID data not involving products of the first enterprise.

9. The method of claim 1, wherein the first plurality of devices is aggregated as a first logical RFID reader according to requirements of the ECSpec.

10. The method of claim 1, wherein the first plurality of physical devices are distributed among more than one geographic location.

11. The method of claim 1, wherein the requesting device comprises an EPC server.

12. The method of claim 1, wherein the physical RFID reader is configured with middleware.

13. The networking method of claim 1, wherein the domain name server (DNS) entry of each of the plurality of RFID readers is updated such that the DNS entry includes a text record identifying the domain name of the corresponding one of the first plurality of controllers.

14. A network, comprising:
a plurality of RFID devices in various locations of a site;
a plurality of controllers associated with the site;
a plurality of middleware servers associated with the site;
a DNS server configured to maintain network addresses and corresponding location and site information;
an application server configured to create, automatically, an entry in the DNS server corresponding to all registered devices of a site; and
an assigner configured to assign RFID devices to controllers and to assign controllers to middleware servers,
wherein each of the plurality of RFID devices is provisioned with an RFID device network address, an assigner network address and instructions to send a request to the assigner for a controller, and wherein the assigner is configured to assign an RFID device to a controller in response to the request; and
wherein each of the plurality of the controllers is provisioned with a controller network address, an assigner network address and instructions to send a request to the assigner for a middleware server, and wherein the assigner is configured to assign a controller to a middleware server in response to the request;
wherein each of the plurality of RFID devices is associated with one of the plurality of controllers by automatically updating a domain name server (DNS) entry of each of the plurality of RFID devices such that the DNS entry identifies a domain name of a corresponding one of the plurality of controllers; and
wherein the plurality of controllers are associated with the plurality of middleware servers by automatically updating DNS entries.

15. The network of claim 14, wherein the assigner comprises a load balancer.

16. The network of claim 14, wherein the application server is configured to send requests to a middleware server and wherein the middleware server retrieves controller location information and provides the controller location information to the application server in response to the application server's request.

17. The network of claim 14, wherein the application server is configured to send requests to a controller and wherein the controller retrieves RFID reader location information and provides the RFID reader location information to the application server in response to the application server's request.

18. The network of claim 14, wherein the middleware servers are configured to do the following:
receive a request from a requesting device for RFID data regarding a single enterprise;
filter RFID tag reads according to the request; and
return RFID data regarding the single enterprise to the requesting device.

19. A network, comprising:
means for receiving, from a requesting device, a first request for information regarding a virtual radio frequency identification ("RFID") reader;
means for translating the first request into second requests for data from a first plurality of devices aggregated as a first logical RFID reader, the first plurality of devices comprising a first plurality of controllers;
means for automatically associating RFID readers with the first plurality of controllers by automatically updating a domain name server (DNS) entry of each of the RFID readers such that the DNS entry identifies a domain name of a corresponding one of the first plurality of controllers;
means for automatically associating middleware servers with the first plurality of controllers by automatically updating domain name server (DNS) entries;
means for sending at least one of the second requests to the first plurality of controllers;

means for receiving RFID data from the first plurality of controllers responsive to the second requests; and means for sending at least some of the RFID data to the requesting device in response to the first request.

20. Software stored on a machine-readable medium, the software comprising instructions for controlling one or more devices in a network to perform the following steps:

receive, from a requesting device, a first request for information regarding a virtual radio frequency identification ("RFID") reader;

translate the first request into second requests for data from a first plurality of devices aggregated as a first logical RFID reader, the first plurality of devices comprising a first plurality of controllers;

associate RFID devices with the first plurality of controllers by automatically updating domain name server (DNS) entries of the RFID devices such that each of the DNS entries identifies a domain name of a corresponding one of the first plurality of controllers;

associate a middleware server with the first plurality of controllers by automatically updating (DNS) entries;

send at least one of the second requests to the first plurality of controllers;

receive RFID data from the first plurality of controllers responsive to the second requests; and send at least some of the RFID data to the requesting device in response to the first request.

21. The method of claim 1, wherein each of the first plurality of controllers is configured to request a middleware server.

* * * * *